(12) United States Patent
Mourtada et al.

(10) Patent No.: US 7,586,102 B2
(45) Date of Patent: Sep. 8, 2009

(54) AUTOMATED SYSTEM FOR FORMULATING RADIOPHARMACEUTICALS

(75) Inventors: Firas Mourtada, Houston, TX (US); Ali Azhdarinia, Houston, TX (US); David Yang, Sugar Land, TX (US); Changsok Oh, Houston, TX (US)

(73) Assignee: Board of Regents the University of Texas System, Austin, TX (US)

( * ) Notice: Subject to any disclaimer, the term of this patent is extended or adjusted under 35 U.S.C. 154(b) by 375 days.

(21) Appl. No.: 11/726,853

(22) Filed: Mar. 23, 2007

(65) Prior Publication Data

US 2008/0035542 A1 Feb. 14, 2008

Related U.S. Application Data

(60) Provisional application No. 60/822,306, filed on Aug. 14, 2006.

(51) Int. Cl.
*G01N 33/53* (2006.01)
(52) U.S. Cl. ............... 250/432 PD; 250/251; 250/428; 250/492.1
(58) Field of Classification Search ............ 250/251, 250/428, 435 PD, 492.1
See application file for complete search history.

(56) References Cited

U.S. PATENT DOCUMENTS

| | | | |
|---|---|---|---|
| 4,025,408 A | 5/1977 | Marling | |
| 4,257,860 A | 3/1981 | Marling et al. | |
| 5,591,974 A | 1/1997 | Troyer et al. | |
| 5,808,020 A | 9/1998 | Ferrieri et al. | |
| 6,511,603 B1 | 1/2003 | Dietz et al. | |
| 6,603,127 B1 | 8/2003 | Scheinberg et al. | |
| 6,787,042 B2 | 9/2004 | Bond et al. | |
| 2004/0084340 A1 | 5/2004 | Morelle et al. | |
| 2005/0276751 A1 | 12/2005 | Chao et al. | |
| 2005/0277833 A1 | 12/2005 | Williams, Jr. | |
| 2006/0022127 A1 | 2/2006 | Zyuzin | |

FOREIGN PATENT DOCUMENTS

| | | |
|---|---|---|
| WO | WO 2004/089425 A1 | 10/2004 |
| WO | WO 2004/089517 A1 | 10/2004 |

(Continued)

OTHER PUBLICATIONS

Brodack et al., "Automated production of several positron-emitting radiopharmaceuticals using a single laboratory robot", Int. J. Rad. Appl. Instrum. [A] 39:689-698, 1988.

(Continued)

*Primary Examiner*—David A Vanore
*Assistant Examiner*—Michael Maskell
(74) *Attorney, Agent, or Firm*—Vinson & Elkins L.L.P.

(57) ABSTRACT

The present invention provides automated systems for the purification of radioisotopes, the formulation of radiopharmaceuticals or both. In preferred embodiments the radioisotopes are produced by a generator. In further preferred embodiments the automated systems comprise replaceable cassettes for easy replacement of the system's networks of tubing. Also provided are replaceable cassettes and kits for use with the automated systems of the invention.

The invention further provides methods of using an automated system to purify radioisotopes, formulate radiopharmaceuticals or to do both in series.

30 Claims, 34 Drawing Sheets

FOREIGN PATENT DOCUMENTS

| WO | WO 2005/057589 A2 | 6/2005 |
|---|---|---|
| WO | WO 2005/057589 A3 | 6/2005 |
| WO | WO 2005/123144 A2 | 12/2005 |
| WO | WO 2005/123144 A3 | 12/2005 |

OTHER PUBLICATIONS

Crouzel et al., "Radiochemistry Automation for PET", in Radiopharmaceuticals for Positron Emission Tomography (Pike, ed., Kluwer Acad. Pub., Netherlands, pp. 45-89, 1993).

Gatley et al., "Radiopharmaceuticals for positron emission tomography. Development of new, innovative tracers . . . ", Acta Radiol. Suppl. 374:7-11, 1990.

Hamacher et al., "Efficient sterospecific synthesis of no-carrier-added 2-[18F]-fluoro-2-deoxy-D-glucose . . . ", J. Nucl. Med. 27:235-238, 1986.

International Search Report, International Application No. PCT/US2007/017890, Issued Jan. 16, 2008.

Mason and Mathis, "Positron emission tomography radiochemistry", Neuroimaging Clin. N. Am. 13:671-687, 2003.

Paulino et al., "Role of fusion in radiotherapy treatment planning", Semin. Nucl. Med. 33:238-243, 2003.

Satyamurthy et al., "Electronic generators for the production of positron-emitter labeled radiopharmaceuticals", Clin. Positron Imaging 2:233-253, 1999.

Schillaci and Simonetti, "Fusion imaging in nuclear medicine—applications of dual-modality systems in oncology", Cancer Biother. Radiopharm. 19:1-10, 2004.

Srivastava, "Is there life after technetium: what is the potential for developing new broad-based radionuclides?", Semin. Nucl. Med. 26:119-131, 1996.

Co-pending U.S. Appl. No. 12/004,340, filed Dec. 20, 2007.

Meyer et al., "68Ga-labelled DOTA-derivatised peptide ligands", Eur. J. Nucl. Med. Mol. Imaging 31:1097-1104, 2004.

Maecke et al., "68Ga-Labeled Peptides in Tumor Imaging", J. Nucl. Med. 46:172S-178S, 2005.

Velikyan et al., "Microwave-Supported Preparation of 68Ga Bioconjugates with High Specific Radioactivity", Bioconjugate Chem. 15:554-560, 2004.

Raytest Isotopenmessgerate GmbH, SynChrom Radiosynthesis Instruments, Product Literature (11 pages) and Brochure (6 pages), Jul. 27, 2006.

GE Medical Systems—Americas, TRACERlab MXFDG and FXFDG Radiopharmacy Synthesizers, Product Literature (6 pages), Jul. 27, 2006.

Step 1. Elution of $^{68}$Ge/$^{68}$Ga generator with HCl and collection of 1 ml "dead volume" into waste bottle #1.

Step 2. Elution of $^{68}$Ge/$^{68}$Ga generator with HCl and collection of 4 ml of $^{68}$GaCl$_3$ into concentration vessel.

Step 3. Purging of lines with $N_2$ gas to collect entire volume.

Step 4. Concentration of $^{68}GaCl_3$ with 30% HCl

Step 5. Transfer of $^{68}GaCl_3$ onto ion exchange column using $N_2$ gas. Waste volume collected in waste bottle #2.

Step 6. Removal of $^{68}$Ge from ion exchange column using 4M HCl. $^{68}$Ge collected in waste bottle #2 and radioactivity recorded.

Step 7. Purging of lines with $N_2$ gas to remove all HCl.

Step 8. Removal of $^{68}GaCl_3$ from column using distilled water and transfer into reaction vessel on formulation panel.

Step 9. Purging of lines with $N_2$ gas to collect remaining $^{68}GaCl_3$ into reaction vessel on formulation panel.

Step 10. Collection of $^{68}GaCl_3$ into reaction vessel on formulation panel.

Step 11. Dispensing of chelating-bioconjugate into reaction vessel.

Step 12. Purging of lines with $N_2$ gas to collect entire volume.

Step 13. Dispensing of transchelator to trap any unreacted $^{68}GaCl_3$.

Step 14. Purging of line with $N_2$ gas to collect entire volume.

Step 15. Dispensing of buffer solution to adjust strength of final formulation.

Step 16. Collection of final product using $N_2$ gas for transfer.

AUTOMATED SYSTEM FOR FORMULATING RADIOPHARMACEUTICALS

This application claims priority to U.S. Provisional Patent Application Ser. No. 60/822,306.

BACKGROUND OF THE INVENTION

1. Field of the Invention

The present invention relates to the field of radiopharmaceutical synthesizers. More particularly, the invention relates to an automated system for purifying radioisotopes and formulating radiopharmaceuticals having replaceable cassettes and methods of its use.

2. Description of Related Art

Non-invasive medical imaging techniques such as Positron Emission Tomography (PET) and Single Photon Emission Computed Tomography (SPECT) have been experiencing explosive growth due to advances in functional imaging technology. New molecular imaging targets for diagnosis and therapy have been developed to visualize disease states and pathological processes without surgical exploration of the body. In particular, targeted radiopharmaceuticals offer promising capabilities for the non-invasive assessment of the pathophysiology of diseases. However, radiopharmaceuticals suitable for clinical use have been limited, which has led to the recent development of new radiopharmaceuticals with improved sensitivity, specificity, signal-to-background ratio and biodistribution.

One factor that has limited the number of suitable radiopharmaceuticals available relates to the relatively short half lives of the radioisotopes used in radiopharmaceuticals. Short half-lives are required to provide a strong signal during imaging and to subsequently limit the patient's exposure to radioactive materials after the imaging is completed.

To date, the most commonly used radioisotopes have been those derived from a cyclotron. Cyclotrons accelerate charged particles to high speeds causing the charged particles to collide with a target and thereby produce radioisotopes. While effective, cyclotrons are large and costly systems. As a result, many medical imaging facilities must obtain their radioisotopes from cyclotron facilities that are significant distances away. The time that it takes to synthesize radiotracers from the radioisotopes and deliver them to a medical imaging facility necessitates that the radioisotopes used have somewhat longer half lives than might otherwise be ideal.

An attractive alternative to obtaining radioisotopes from cyclotrons is available. This alternative involves the use of small radioisotope generators that are far more economical than cyclotron facilities. These generators are based on a parent-daughter (P/D) nuclidic pair wherein a relatively long-lived parent isotope decays to a short-lived daughter isotope suitable for imaging. The parent isotope, which is produced at a cyclotron facility, can be shipped to a clinical site and is the source from which the daughter isotope may be readily eluted. Generators of this type are smaller and relatively inexpensive and therefore more easily affordable for use on-site at a medical imaging facility.

One example of such generators are the $^{68}Ge/^{68}Ga$ generators. $^{68}Ge$ is the parent nuclide and has a half-life of 271 days. $^{68}Ge$ decays to produce the positron-emitting $^{68}Ga$, which has a half-life of 68 minutes. Periodically $^{68}Ga$ can be selectively eluted from the generator using an acidic solution. The eluted radioisotope must then be purified and formulated as a radiopharmaceutical appropriate for use as a radiotracer.

The short half-life of $^{68}Ga$ permits applications with suitable radioactivity while maintaining patient dose to an acceptable level. Furthermore, $^{68}Ga^{3+}$ cation can form stable complexes with many ligands containing oxygen and nitrogen as donor atoms. This makes $^{68}Ga$ suitable for complexation with various chelators and macromolecules. Over the last three decades, several $^{68}Ge/^{68}Ga$ generators have been developed that provide a high yield of $^{68}Ga$ and relatively low breakthrough of $^{68}Ge$. While some purification of the $^{68}Ga$ obtained from such generators may be required, the $^{68}Ga$ that is produced is highly suitable for the formulation of radiopharmaceuticals.

Radioisotope purification and radiopharmaceutical formulation require intricate handling of radioactive materials, fast reaction times, ease of synthesis and reproducible results. Synthesis of radiotracers is therefore challenging for several reasons: 1) the synthesized radiopharmaceuticals must meet strict sterility and pyrogenicity requirements which must be validated from batch to batch; 2) the system must be highly reproducible from batch to batch, demonstrating suitable radiochemical yield, radiochemical purity, pH and specific activity; 3) the synthesis time must be fast when dealing with radionuclides with a short half-life or the nuclides will lose their utility as radiotracers; and 4) the purification and synthesis equipment and protocols used must afford maximal protection for radiochemists doing the purification and synthesis by minimizing their exposure to the highly radioactive materials being handled. The Food and Drug Administration (FDA) permits radiopharmaceuticals produced under well-controlled conditions in central commercial facilities to be distributed to local clinics where they are administered. In addition, radionuclide generator systems used in well-controlled facilities have gained FDA acceptance and have a long history of successful clinical application. The clinical application of generator-based radiotracers is therefore mainly limited only by the half-life of produced (daughter) radioisotopes and the choices of imaging agents.

Currently, there is no commercially available synthesizing apparatus for $^{68}Ga$-based PET imaging agents. The only commercially available automated synthesizer for generator-based PET imaging is the $^{62}Cu$ generator ($^{62}Zn/^{62}Cu$). However these systems are designed only to synthesize a single type of radiopharmaceutical, they do not provide mechanisms that control or monitor the progress of the synthesis nor do they provide interchangeable cassettes or cartridges for rapid and convenient cleaning of the system.

Fully-automated systems for radiopharmaceutical synthesis have been developed for synthesis of radiopharmaceuticals from cyclotron-derived radioisotopes such as the GE TRACERlab MX line of products. Such devices have not been designed however for use with generator-derived radioisotopes such as $^{68}Ga$. These devices are small enough to fit in a standard laboratory hot cell and in some cases make use of replaceable cartridges that permit the user to rapidly replace between runs the components that were in contact with radioactive materials. Generally, however, automated systems of this type do not purify radioisotopes because purification is generally not required for cyclotron-derived radioisotopes. Also each device is customized to formulate one particular type of radiopharmaceutical and is not designed to be adapted by the user to formulate other types of radiopharmaceuticals, even those that use the same radioisotope.

Meyer et al. (Meyer, G. J., H. Macke, J. Schuhmacher, W. H. Knapp and M. Hofmann. $^{68}Ga$-labelled DOTA-derivatised peptide ligands, Eur. J. Nucl. Med. Mol. Imaging (2004) 31:1097-1104 (2004)) discloses a semi-automated system for purification of $^{68}Ga$ and synthesis of a single type of $^{68}Ga$ radiopharmaceutical, DOTA-derivatized peptide ligands. The disclosed system permits monitoring and on-line control of most, but not all steps in the process. Furthermore the disclosed system does not provide any mechanism for adapting the system to the purification of other radionuclides or the synthesis of other radiopharmaceuticals. The disclosed system also does not eliminate dead volume loss nor does it provide for a rapid and simple mechanism for replacing parts in contact with the radionuclide or radiopharmaceutical between syntheses.

WO 2005/057589 discloses systems and methods for synthesizing oil-soluble and water-soluble radioisotopic agents. Automated systems are disclosed for preparing radioisotopes and subsequently synthesizing radiotracers from those isotopes. The automated systems comprising valve assemblies coupled to a control unit. The application does not, however, disclose a mechanism for the rapid and simple replacement of parts in contact with radioactive materials between syntheses.

Therefore there is a need in the art for fully-automated devices that purify generator-produced radioisotopes and formulate radiopharmaceuticals from the purified radioisotopes. Ideally, the required device would be easily adaptable for use with different radioisotopes and for the formulation of different radiopharmaceuticals. The ideal device would also be designed to have replaceable parts that could be exchanged easily between runs and would minimize a user's exposure to radioactive materials during the preparation of purified radioisotopes or radiopharmaceuticals.

BRIEF SUMMARY OF THE INVENTION

The present invention provides an automated system for purifying a radioisotope and formulating radiopharmaceuticals containing the purified radioisotope comprising: an elution station capable of receiving an isotope from a generator; a module comprising a base panel, a purification panel, and a formulation panel; wherein both the purification panel and the formulation panel further include a plurality of valves and at least one reaction vessel; a removable interchangeable isotope specific purification cassette capable of receiving a radioisotope from the elution station comprising one or more networks of tubing mounted on a rigid support, wherein the purification cassette connects to the purification panel of the module and the network of tubing is engaged by one or more of the plurality of valves; a removable interchangeable specific formulation cassette comprising one or more networks of tubing mounted on a rigid support, wherein the formulation cassette connects to the formulation panel of the module and the network of tubing is engaged by one or more of the plurality of valves; one or more pumps in fluid communication with the network of tubing of the purification cassette and the formulation cassette; and a control system, wherein the pumps and valve assembly are at least partially controlled by the control system. In certain embodiments, the automated system further includes at least one chromatography column in fluid communication with the network of tubing of the purification cassette.

In certain embodiments, the automated system also comprises at least one generator based on a parent-daughter nuclidic pair such as a $^{68}$Ga, $^{44}$Sc, $^{52m}$Mn, $^{62}$Cu, $^{72}$As, $^{82}$Rb, $^{99m}$Tc, $^{118}$Sb, $^{122}$I, $^{128}$Cs, $^{178}$Ta or $^{195m}$Au generator. In other embodiments the automated system also includes radiation sensors that send information to the control system.

The present invention provides a method for formulating a radiopharmaceutical from a radioisotope using the automated systems above comprising the steps of: (a) supplying fluids to a pump reservoir of one or more pumps of the automated system; (b) using the control system to control one or more pumps and one or more valves of the automated system to direct the fluids through the network of tubing, the chromatography column and the reaction vessel so as to formulate a radiopharmaceutical.

In certain embodiments of the present invention, the automated system for purifying radioisotopes and formulating radiopharmaceuticals comprising: an elution station capable of receiving a radioisotope from at least one generator; one or more pumps; a module having a base panel, a purification panel and a formulation panel; a control system electronically connected to the one or more valves or the one or more pumps; at least one reaction vessel; a removable isotope specific purification cassette which includes a network of tubing mounted on a rigid support and attaches to the purification panel of the module; and a removable specific formulation cassette which includes a network of tubing mounted on a rigid support and attaches to the formulation panel of the module. In some such embodiments, the a purification panel includes at least one valve and a replaceable chromatography column having an input end and an output end and the formulation panel that includes one or more valves and at least one fluid collection vessel. The network of tubing in the purification cassette can further include a first tubing segment in fluid communication with the elution station and the at least one fluid collection vessel, a second tubing segment in fluid communication the at least one fluid collection vessel and a reagent reservoir; a third tubing segment in fluid communication with the at least one fluid collection vessel and the input end of the chromatography column, and a fourth tubing segment in fluid communication with the output end of the chromatography column. The network of tubing in the formulation cassette further can include a first tubing segment in fluid communication with the network of tubing of the purification cassette and the at least one reaction vessel, a second tubing segment in fluid communication with the at least one reaction vessel and at least one reagent reservoir, and a third tubing segment for radiopharmaceutical collection in fluid communication with the at least one reaction vessel.

The present invention further provides for one or more of the tubing segments to be in fluid communication with a gas regulator capable of directing the flow of liquids within the tubing segments.

In embodiments that include a purification panel and a formulation panel. The purification and formulations panels or sections can be mounted at an approximately 90° angle to each other. In certain such embodiments, the formulation and/or purification panels are rotatably slidable with respect to one another such that the angle between the panels can be increased for loading and maintenance procedures.

The present invention also provides kits comprising:
a. A removable interchangeable radioisotope specific purification cassette comprising a network of tubing and a rigid support configured to engage valves on an automated radioisotope purification system;
b. a sterile, non-pyrogenic solution of about 4.0 N to about 9.5 N HCl; and
c. a sterile, non-pyrogenic solution of about 0.05 N to about 1.0 N HCl. or kits comprising:
a. a removable interchangeable specific formulation cassette comprising a network of tubing and a rigid support configured to engage valves on an automated radiopharmaceutical formulation system;
b. a sterile, non-pyrogenic solution of a chelating bioconjugate; and
c. a sterile, non-pyrogenic solution of transchelator.

In preferred embodiments one or more of the solutions in the kits are supplied in a replaceable pump reservoir. In other preferred embodiments the network of tubing supplied in the kits comprises labels indicating how the tubing should be connected to an automated system for purification of radionuclides.

The present invention further provides a rigid support for a removable (or replaceable) cassette comprising: (a) a rigid support comprising one or more apertures having an edge; and (b) semi-circular channels in the surface of the support that terminate at one or more edges of the apertures, wherein the semi-circular channels are configured to mount a network of tubing on the rigid support. In certain embodiments, a network of tubing is mounted on the rigid support to form a removable cassette.

The present invention also provides a method of manufacturing a device for the purification of radionuclides comprising the steps of: (a) providing an automated system for purifying radionuclides comprising a valve assembly having a plurality of pinch valves; (b) providing a removable interchangeable cassette comprising a rigid support and a network of compressible tubing; and (c) mounting at least one interchangeable cassette such that the network of tubing is engaged by the pinch valves.

Additionally, or alternatively, the present invention provides a method of manufacturing a device for the formulation of radiopharmaceuticals comprising the steps of: (a) providing an automated system for formulating radiopharmaceuticals comprising a first valve assembly having a plurality of pinch valves; (b) providing a first interchangeable cassette comprising a rigid support and a network of compressible tubing; and (c) mounting the first interchangeable cassette such that the network of tubing is engaged by the pinch valves of the first valve assembly.

BRIEF DESCRIPTION OF THE SEVERAL VIEWS OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Figure 1:
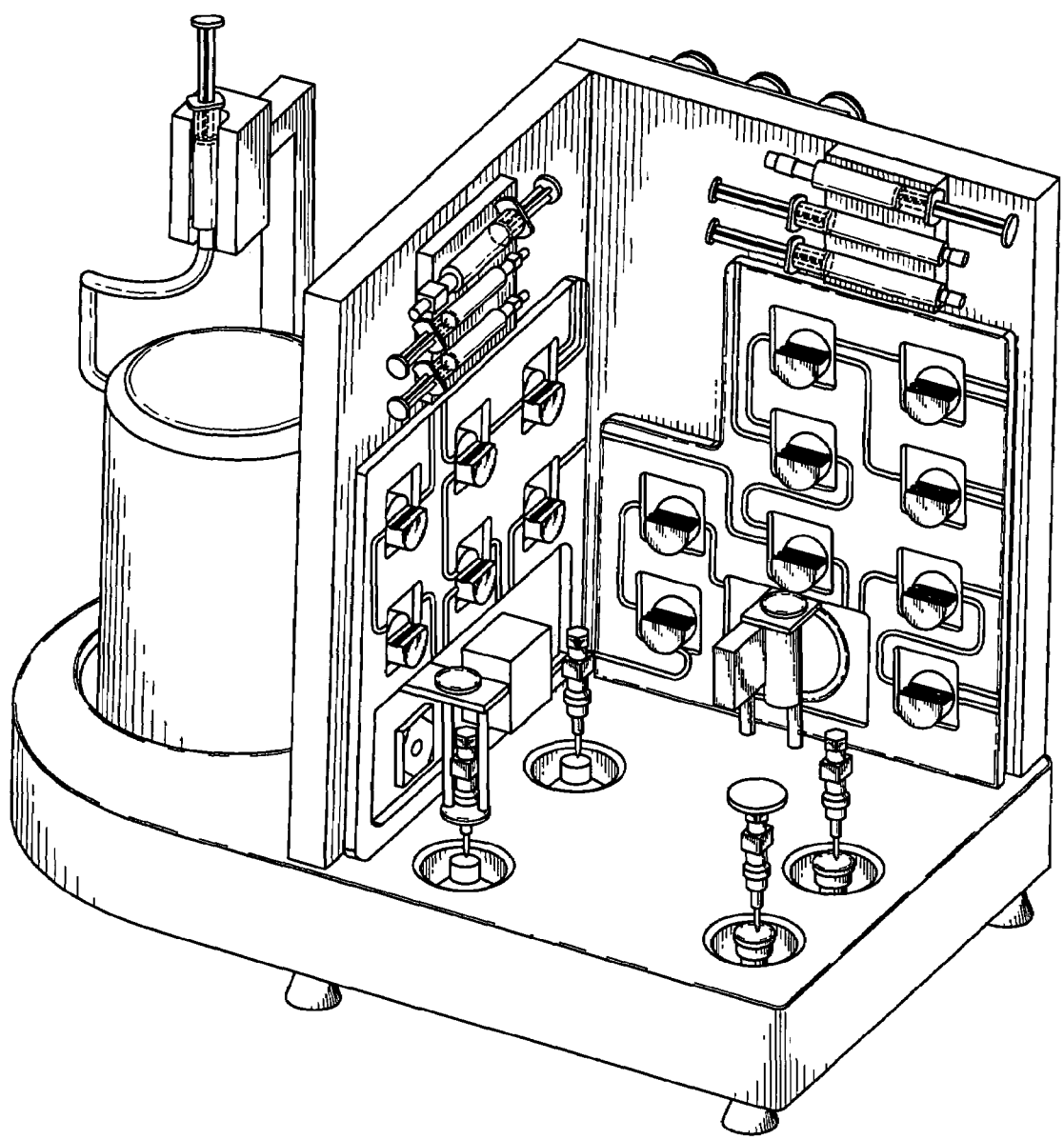
FIG. 1. Fully-automated radioisotope purifier and radiopharmaceutical synthesizer shown with a $^{68}$Ge/$^{68}$Ga Cyclotron Co. generator installed in the platform.
Figure 2:
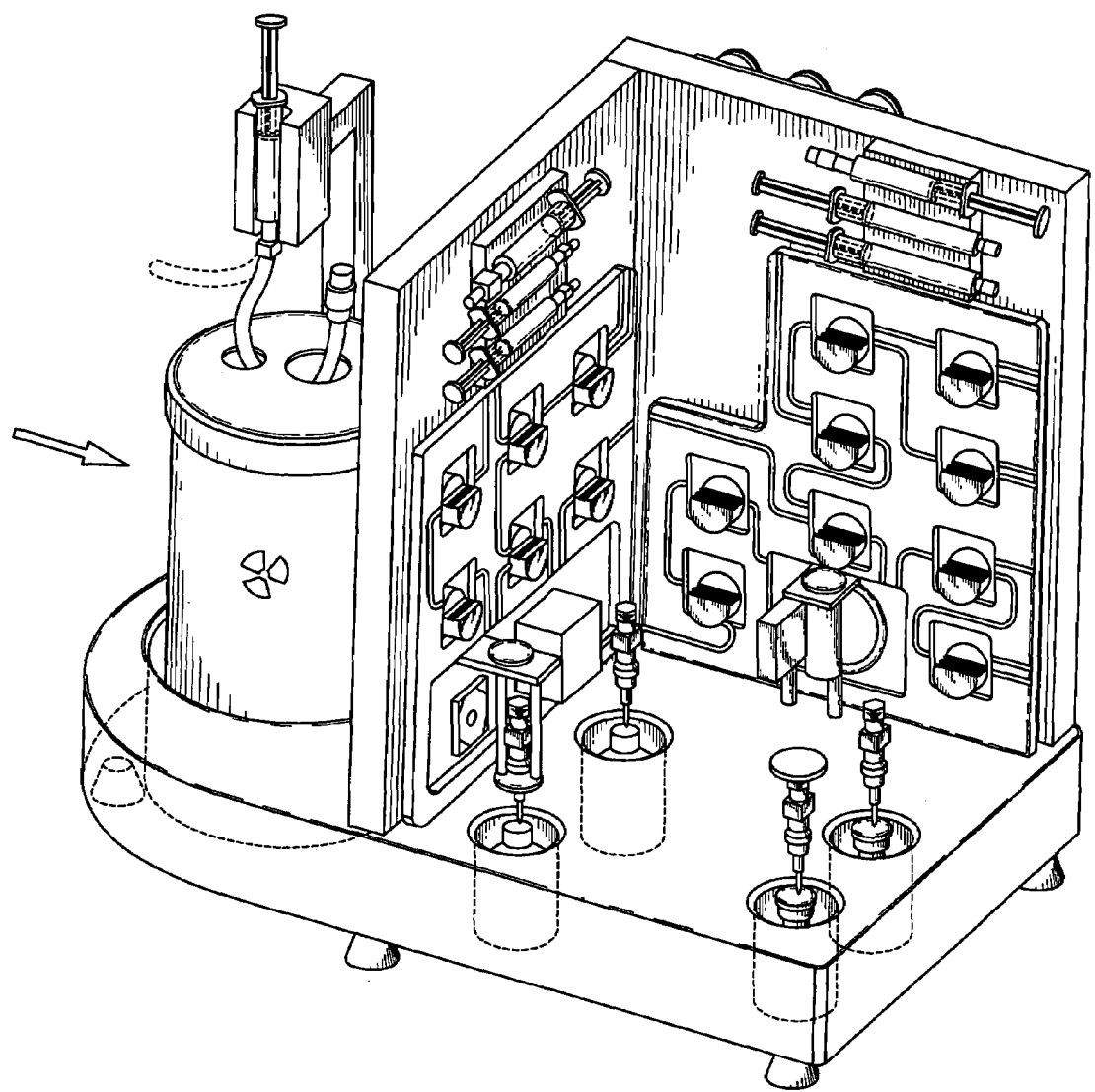
FIG. 2. Alternate view of fully-automated radioisotope purifier and radiopharmaceutical synthesizer shown with a $^{68}$Ge/$^{68}$Ga Cyclotron Co. generator installed in the platform.
Figure 3:
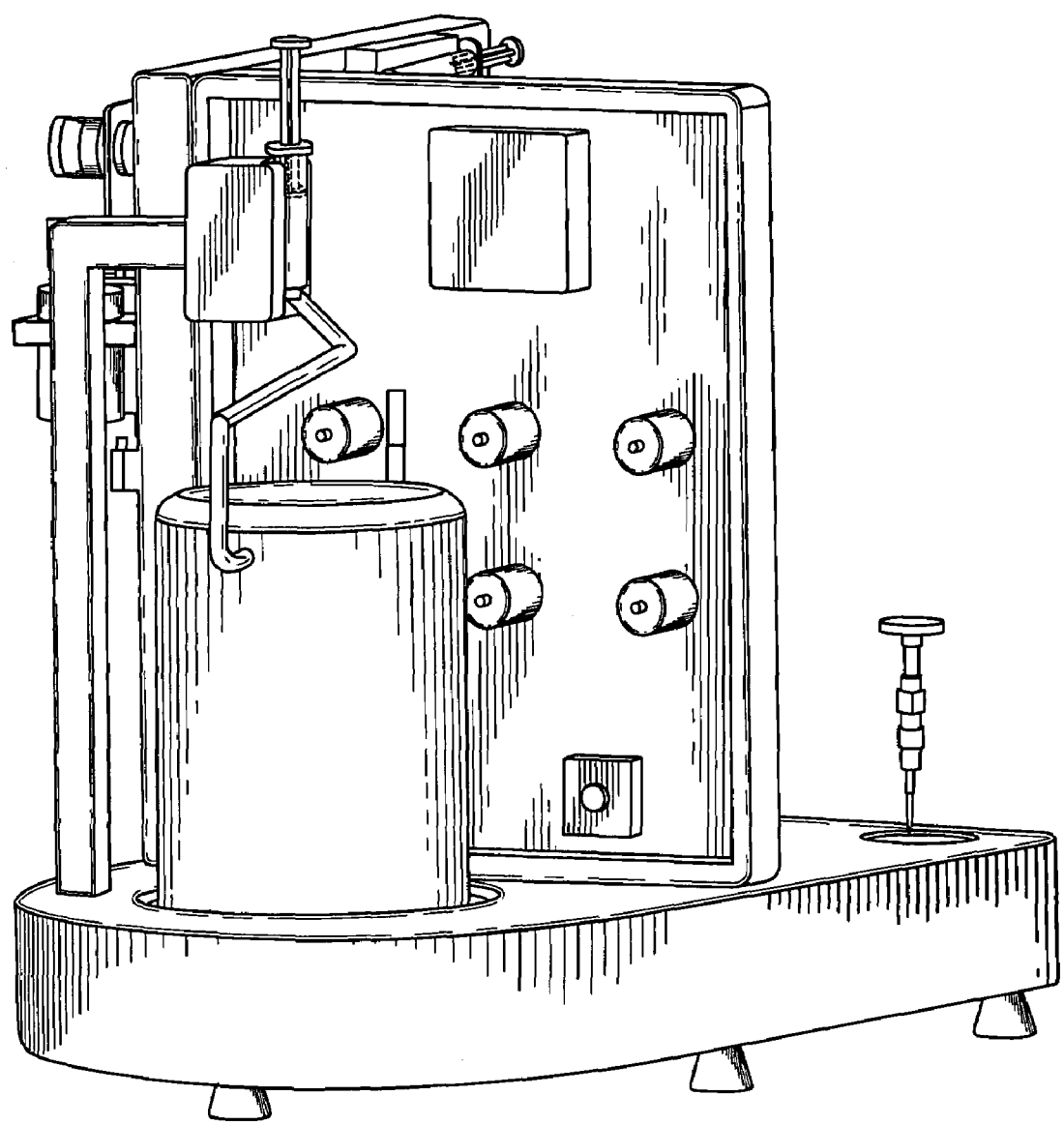
FIG. 3. Rear view of the purification panel as installed in the automated system.
Figure 4:
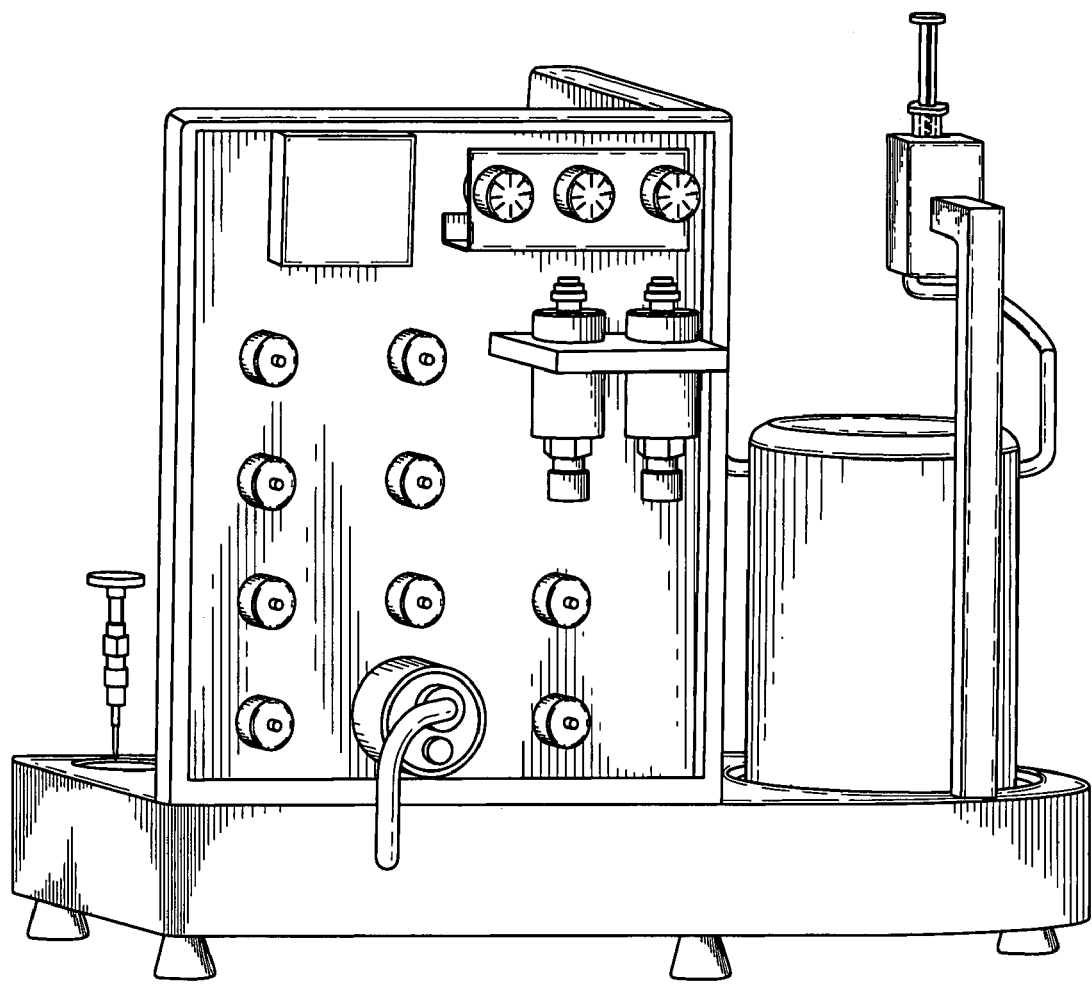
FIG. 4. Rear view of the formulation panel as installed in the automated system, shown with a nitrogen regulator and three distribution stations.
Figure 5:
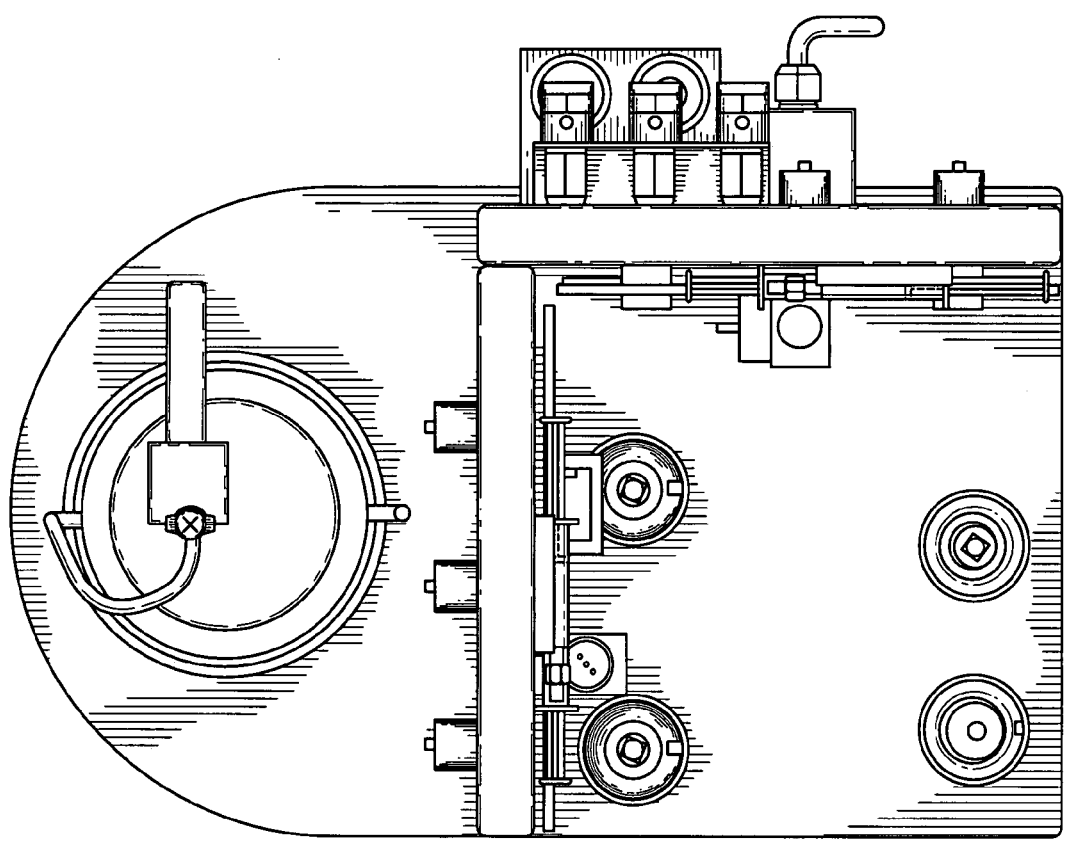
FIG. 5. View of the automated system from the top showing the wells for four waste collection vials inset in the platform and a collection vessel.
Figure 6:
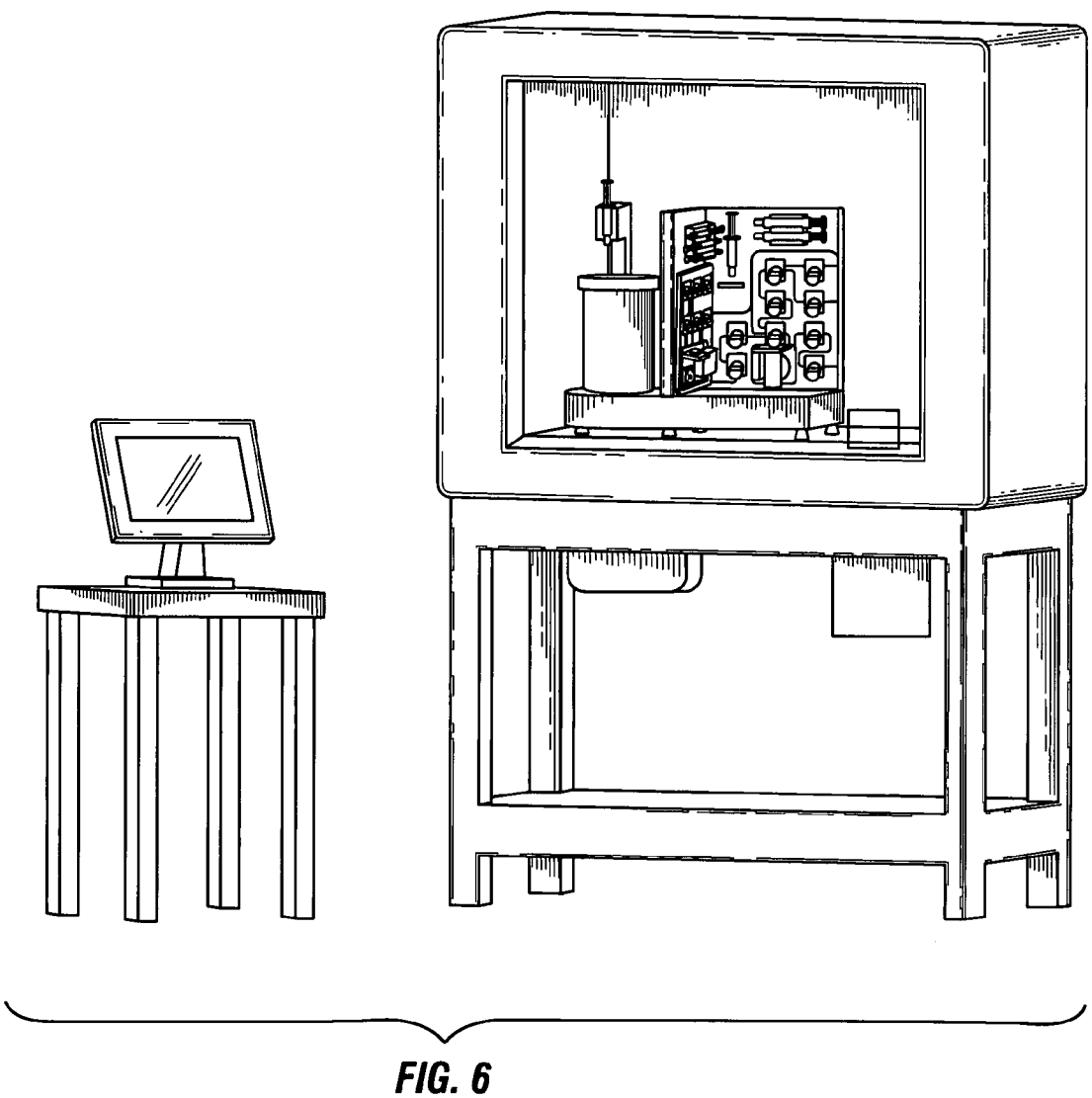
FIG. 6. View of the automated system within a standard hot-cell capable of remote operation via computer.

Nuclear imaging consists of chemicals or biochemicals that are tagged with radioactive materials to provide contrast between sites which take up the agent and those which do not. Development of such agents rely on a variety of radiochemistry techniques which are performed by trained radiochemists. While most radiochemists perform manual syntheses of imaging agents, reproducibility, reaction time and radioactive exposure are key concerns when developing agents directed towards clinical use. To address these concerns, automation of radiochemistry has been employed for several cyclotron-produced radionuclides. However, many sites lacking cyclotrons are currently left with limited cost-effective options for performing Positron Emission Tomography (PET) clinic/research. Sites lacking a cyclotron could utilize preferred embodiments of the automated system of the present invention to take advantage of the accessiblity and affordability of radioisotope generators.

In certain embodiments, the present invention provides a console or electromechanical instrument that can be used to purify radionuclides. In alternate embodiments the present invention is directed to a console or electromechanical instrument that can be used to formulate radiopharmaceuticals using purified radionuclides. In certain embodiments, the present invention is directed to a console or electromechanical instrument that can be used to both purify radionuclides and formulate them as radiopharmaceuticals. The console is a small, compact apparatus that in preferred embodiments is designed to fit the dimensions of a standard laboratory hotbox. The apparatus can include various pumps, valves, collection vessels, purification columns, radiation sensors and other devices needed to purify radionuclides and formulate radiopharmaceuticals using removably interchangeable cassettes of pre-mounted tubing.

For purposes of the present invention "radioisotopes" or "radionuclides" are radiation-emitting compounds such as $^{68}$Ga that are suitable for use in radiopharmaceuticals. "Radiometals" are types of radioisotopes or radionuclides.

For the purposes of the present invention "radiopharmaceuticals" are compounds suitable for use in medical applications such as nuclear imaging, chemotherapy and the like. Radiotracers are types of radiopharmaceuticals useful specifically in medical imaging or other methods of detecting specific biological structures in a biological organism. Radiopharmaceuticals are generally provided in a pharmaceutically-acceptable carrier.

As used herein "purification" of a radioisotope means removing any contaminants such as trace metals, parent nuclides, pyrogenic contaminants and the like from a quantity of radioisotope to produce radioisotopes suitable for use in pharmaceuticals.

As used herein "formulation" of a radiopharmaceutical preferably means chemically modifying a radioisotope to produce a compound suitable for use as a radiopharmaceutical, but additionally can mean adjusting the pH, concentration or other physical characteristics of a radiopharmaceutical preparation to render it suitable for pharmaceutical use.

In certain embodiments, the console includes a purification section that operates to collect, process and refine a radioisotope such as $^{68}$Ga. This process allows for removal of contaminants which may affect radiolabeling and also concentrates the radioisotope in water. Inert gas flow is preferably used to direct the flow of solutions through an isotope cassette mounted on the purification panel and to eliminate dead volume losses. In certain preferred embodiments, upon the completion of the purification the radioisotope is transferred to a formulation panel.

The present invention provides an automated system for purifying and concentrating a radioisotope and formulating human-grade radiopharmaceuticals containing the purified radioisotope comprising: an elution station capable of receiving a radioisotope from a generator; a module comprising a purification panel, a formulation panel and a base panel; wherein both the purification panel and the formulation panel further include a plurality of valves and at least one reaction vessel; a removable interchangeable specific radioisotope purification cassette capable of receiving a radioisotope from the elution station comprising one or more networks of tubing mounted on a rigid support, wherein the purification cassette connects to the purification panel of the module and the network of tubing is engaged by one or more of the plurality of valves; a removable interchangeable specific formulation cassette comprising one or more networks of tubing mounted on a rigid support, wherein the formulation cassette connects to the formulation panel of the module and the network of tubing is engaged by one or more of the plurality of valves; one or more pumps in fluid communication with the network of tubing of the purification cassette and the formulation cassette; and a control system, wherein the pumps and valve assembly are at least partially controlled by the control system. In certain embodiments, the automated system further includes at least one chromatography column in fluid communication with the network of tubing of the purification cassette.

In certain embodiments of the present invention, the automated system for purifying and concentrating radioisotopes and formulating human-grade radiopharmaceuticals comprising: an elution station capable of receiving a radioisotope from at least one generator; one or more pumps; a module having a purification panel and a formulation panel; a control system electronically connected to the one or more valves or the one or more pumps; at least one reaction vessel; a removable radioisotope specific purification cassette which includes a network of tubing mounted on a rigid support and attaches to the purification panel of the module; and a removable specific formulation cassette which includes a network of tubing mounted on a rigid support and attaches to the formulation panel of the module. In some such embodiments, the purification panel includes at least one valve and a replaceable chromatography column having an input end and an output end and the formulation section that includes one or more valves and at least one fluid collection vessel. The network of tubing in the purification cassette can further include a first tubing segment in fluid communication with the elution station and the at least one fluid collection vessel, a second tubing segment in fluid communication with the at least one fluid collection vessel and a reagent reservoir; a third tubing segment in fluid communication with the at least one fluid collection vessel and the input end of the chromatography column, and a fourth tubing segment in fluid communication with the output end of the chromatography column. The network of tubing in the formulation cassette further can include a first tubing segment in fluid communication with the network of tubing of the purification cassette and the at least one reaction vessel, a second tubing segment in fluid communication with the at least one reaction vessel and at least one reagent reservoir, and a third tubing segment for radiopharmaceutical collection in fluid communication with the at least one reaction vessel.

Thus in certain embodiments, the console includes a formulation panel alone or in addition to the purification panel. Radioisotopes are introduced into a formulation cassette mounted on the formulation panel either from the purification panel or from another source. The radioisotopes are transferred to a fluid collection (reaction) vessel where they are converted into a radiopharmaceutical, for example by chelation with appropriate bioconjugates. Heating can be carried out to promote the reaction or to remove solvent from the sample, for example through the use of an infrared lamp that can be part of the module. The radiopharmaceutical thus obtained can, in certain embodiments, be formulated and diluted to the appropriate specific activity and transferred to a final collection bottle containing a sterile filter. Again, inert gas flow can be used to direct the flow of solutions through the purification panel and to eliminate dead volumes losses. Certain embodiments of the module, therefore, include a gas regulator.

In certain embodiments, the purification and/or formulation interchangeable cassettes incorporate networks of tubing for transferring solutions. The interchangeable cassettes of the present invention function to locate and support interchangeable tubing components that interact with the pumps, valves, collection vessels, purification columns and sensing components. The invention encompasses an array of different interchangeable specified (or specific) cassettes tailored to a variety of different radionuclide purification processes or to different radiopharmaceutical formulation processes. The use of interchangeable cassettes permits users of the apparatus to rapidly adapt the device for a variety of different radionuclide purification and radiopharmaceutical formulation techniques with ease or to substitute new cassettes for equipment that was contaminated in previous rounds of purification or formulation. Ideally, the cassettes can be replaced by simply snapping the tubing out from the valves and detaching the cassette from the base of the device and further by detaching the tubing from collection vessels, gas regulator ports and the like.

Thus the present invention further provides methods of operating an automated device for the purification of radionuclides comprising the steps of:
providing an automated system for purifying radionuclides comprising a valve assembly having a plurality of valves;
providing an interchangeable cassette comprising a rigid support and a network of compressible tubing; and
mounting at least one interchangeable cassette such that the network of tubing is engaged by the valves.

The present invention further provides a method of operating a device for the formulation of radiopharmaceuticals comprising the steps of:
providing an automated system for formulating radiopharmaceuticals comprising a first valve assembly having a plurality of valves;
providing a first interchangeable cassette comprising a rigid support and a network of compressible tubing;
mounting the first interchangeable cassette such that the network of tubing is engaged by the valves of the first valve assembly,
optionally providing a second interchangeable cassette comprising a rigid support and a network of compressible tubing; and
optionally mounting the second interchangeable cassette such that the network of tubing is engaged by the valves of the second valve assembly.

When the cassette is properly mounted to the apparatus the interchangeable cassette design automatically places the appropriate tubing segments in position for operable connections to be made with the correct pumps, ports, collection vessels, purification columns and the like, thus reducing the potential for error when an operator connects the tubing to the apparatus. In certain embodiments, the cassette can be provided to a user with the tubing segments labeled, preferably by color coding, to indicate where operable connections should be made to the apparatus.

The network of tubing mounted on the purification or formulation sections, such as part of an interchangeable cassette, can be continuous pieces of tubing or can be composed of joined tubing segments so long as the tubing permits fluid communication between the required structures. In preferred embodiments, the network of tubing is branched. In certain embodiments this branching is achieved through the use of tubing connectors such as Y-connectors. Alternatively, in certain embodiments the tubing may be molded or formed as a branched network rather than being separate segments of tubing formed by connectors. Any suitable means of forming the tubing network described in the present invention can be used in the present invention.

As used herein, two or more structures are in "fluid communication" with each other if there is a joining structure that is capable of permitting the transmission of fluids between the two or more structures in at least one direction. For the purposes of this invention, "fluids" includes both liquids and gases.

The console of the present invention also includes or is in communication with a control system for automating steps in the purification and/or formulation protocols. Microprocessor-based electronics and software can be used to monitor and control a variety of different steps in the purification and/or formulation processes. In certain embodiments, the radioactivity can be assessed at each point of the process due to the presence of radiation sensors or detectors which send information to the control system. Certain embodiments of the module, cassettes, or radiation sensors also include attachment points for chromatography columns. Feedback loops can be used to monitor each step. Also, the entire process can be stored as a data file which can be used to monitor reaction conditions and permit troubleshooting.

In certain embodiments, the control system can also identify the cassette installed in it, for example, by reading a bar code or other tag on the cassette using an optical reader. The control system can then provide a user some or all of the following services, for example, initiating or monitoring the process appropriate for that cassette, providing information about appropriate reagents and/or operational steps for use with a particular cassette, or providing information about cassette or kit expiration dates and the like.

In some embodiments, the radioisotopes purified by the console of the present invention are the product of a generator. While in still other embodiments, an elution station of the console can be adapted to receive isotope from multiple sizes of generators and/or multiple generators. This feature will allow for generators to continue to be used after yields, have begun to decrease by connecting more than one generator in series. In preferred embodiments, the radioisotopes formulated as radiopharmaceuticals by the console of the present invention are also the product of a generator. Generators of the present invention include those based upon a parent-daughter nuclidic pairing of $^{68}$Germanium and $^{68}$Gallium. Other types of generators useful in the present invention include, but are not limited to, those based upon parent-daughter nuclidic pairings of: $^{44}$Titanium and $^{44}$Scandium, $^{52}$Iron and $^{52m}$Manganese, $^{62}$Zinc and $^{62}$Copper, $^{72}$Selenium and $^{72}$Arsenic, $^{82}$Strontium and $^{82}$Rubidium, $^{99}$Molybdenum and $^{99m}$Technetium, $^{118}$Tellurium and $^{118}$Antimony, $^{122}$Xenon and $^{122}$Iodine, $^{128}$Barium and $^{128}$Cesium, $^{178}$Tungsten and $^{178}$Tantalum, and $^{195m}$Mercury and $^{195m}$Gold.

Thus in certain embodiments, the present invention provides a fully automated turn-key device which is capable of synthesizing radioisotopic agents such as $^{68}$Ga agents with reproducible yields and purity, fast reaction time and reduced exposure to personnel, while using an interchangeable cassette with embedded tubing that allow for easy replacement between runs and during routine maintenance. In further embodiments, a generator can be linked to the invention and eluted with a software-controlled syringe drive to discharge $^{68}$Ga into the system. $^{68}$Ga can then be processed and refined using the purification panel to yield high-grade $^{68}$Ga, which is a useful product in itself as a purified radioactive source. The purified $^{68}$Ga can then be reacted with a variety of BFCA-bioconjugates to develop a targeted $^{68}$Ga agent appropriate for clinical imaging. The final formulation can then be adjusted using the formulation section to add a transchelator as needed, or dilute the sample to the desired strength. The final product is preferably sterile and suitable for clinical/research studies.

In other embodiments, the module features a layout having a approximately 90-degree profile between the purification and formulation panels to maximize the surface area of the panels and allow for easy manipulation of all parts by the user. For example, the purification and formulation panels can be arranged in an approximately L-shaped or T-shaped configuration rather than an approximately linear arrangement to limit the overall footprint of the module or console or to render it more compact in one dimension. In certain such embodiments, the formulation and/or purification panels are moveable to increase the profile angle with respect to one another to aid in loading maintenance procedures. Those of ordinary skill in the art will readily recognize that a wide variety of known mechanisms can be used to allow such movement, and that these mechanisms are encompassed by the present invention. In additional embodiments, the module and generator are designed to easily fit within a standard hot-cell with ample room for additional components such as a dose calibrator, vacuum pump, etc., within the module.

FIG. 1-FIG. 15, FIG. 32, and FIG. 33 depict an embodiment of the present invention, however any arrangement of the system components can be used so long as the assembled system functions to purify radioisotopes and/or formulate radiopharmaceuticals, for example according to the general steps outlined in FIG. 16-FIG. 31.

Radioisotope Purification Panel

The purification panel or section of the present invention comprises a valve assembly, and in certain embodiments can comprise one or more of the following: receptacles for one or more replaceable automated pumps, one or more non-replaceable pumps, one or more ports for the injection or extraction of fluids, one or more concentration reaction, or fluid collection vessels mounted on the panel, one or more radiation sensors, one or more temperature sensors, one or more gas regulators, and one or more programmable logic controllers or other means of controlling one or more actuators associated with the purification panel. In certain embodiments, the purification panel includes a means for mounting a replaceable cassette comprising a network of replaceable tubing. Alternatively the formulation panel can provide an alternate means for mounting a network of replaceable tubing.

With reference to FIG. 1-FIG. 15, the system comprises a radionuclide generator 101. The radionuclide generator can be any suitable non-cyclotron radionuclide generator including, for example, $^{68}$Ga, $^{44}$Sc, $^{52m}$Mn, $^{62}$Cu, $^{72}$As, $^{82}$Rb, $^{99m}$Tc, $^{118}$Sb, $^{122}$I, $^{128}$Cs, $^{178}$Ta or $^{195m}$Au generators and the like. Numerous types of generator systems are known to those skilled in the art and any generator system that produces a sufficient quantity of a daughter nuclide useful in medical imaging can be used in embodiments of the present invention. Examples of $^{68}$Ga generators known in the art include, but are not limited to, pyrogallol/formaldehyde-type generators, titanium-dioxide-type generators, alumina-type generators and generators comprising styrene-divinyl-benzene copolymer containing N-methylglucamine and the like. Generators based upon parent-daughter nuclidic pairings can comprise parent nuclides associated with an appropriate adsorbent, such as a chromatographic resin including both inorganic absorbents or synthetic organic resins. Inorganic absorbents however are preferred due to their resistance to radiation damage. Inorganic absorbers are primarily composed of the hydrated metal oxides ($SnO_2$, $TiO_2$, $Al_2O_3$), however, any absorbents that permits an acceptable chemical separations of parent and daughter nuclides can be used.

In alternative embodiments, the radionuclide can be obtained from a source other than a generator, such as a cyclotron. In such embodiments, the radionuclides can be introduced directly to the tubing of the purification or formulation panel by means of a port or pump, as appropriate.

Figure 7:
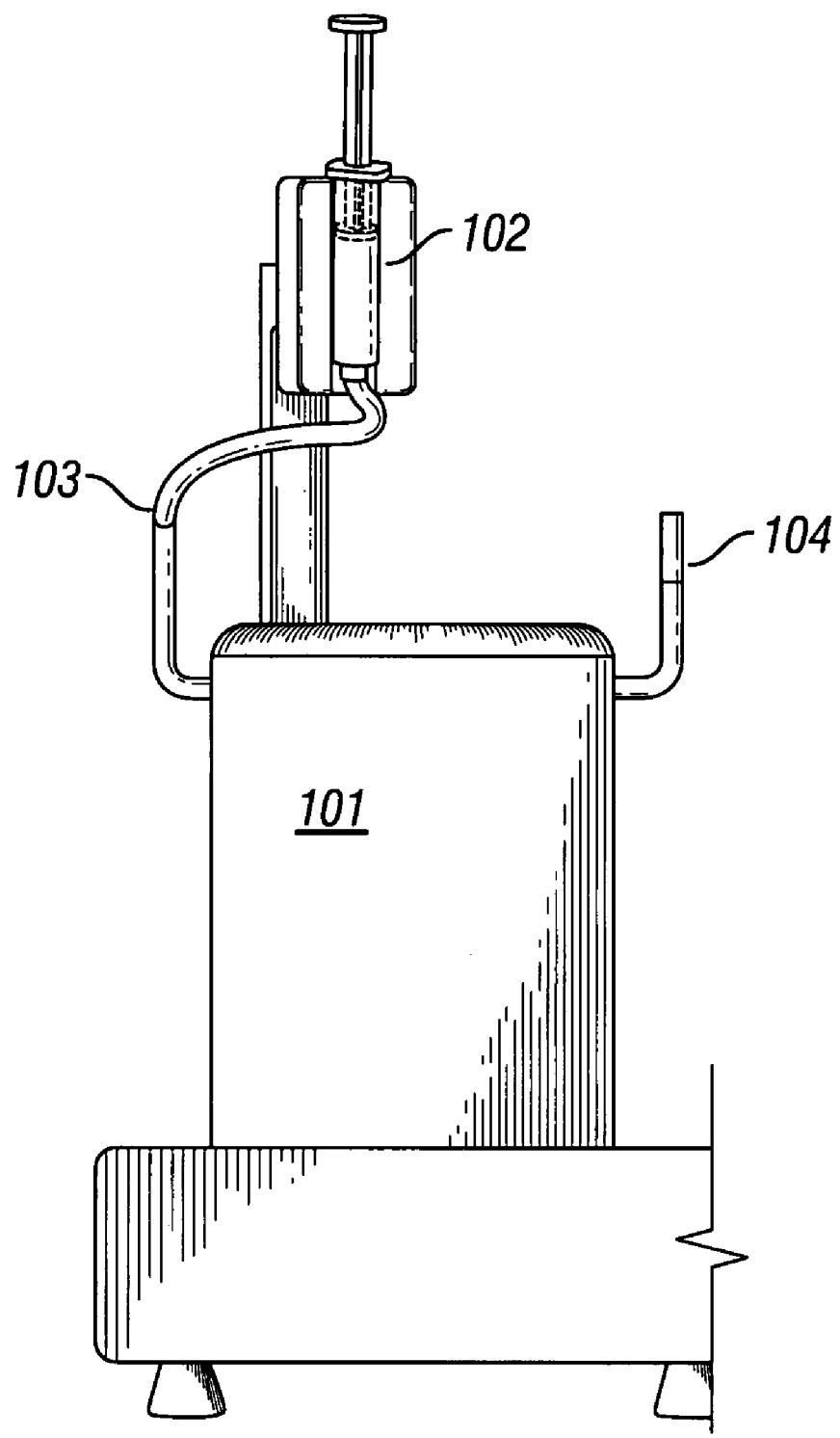
FIG. 7. View of fully-automated syringe pump 102 for eluting $^{68}$Ga from generator 101.
Figure 8A:
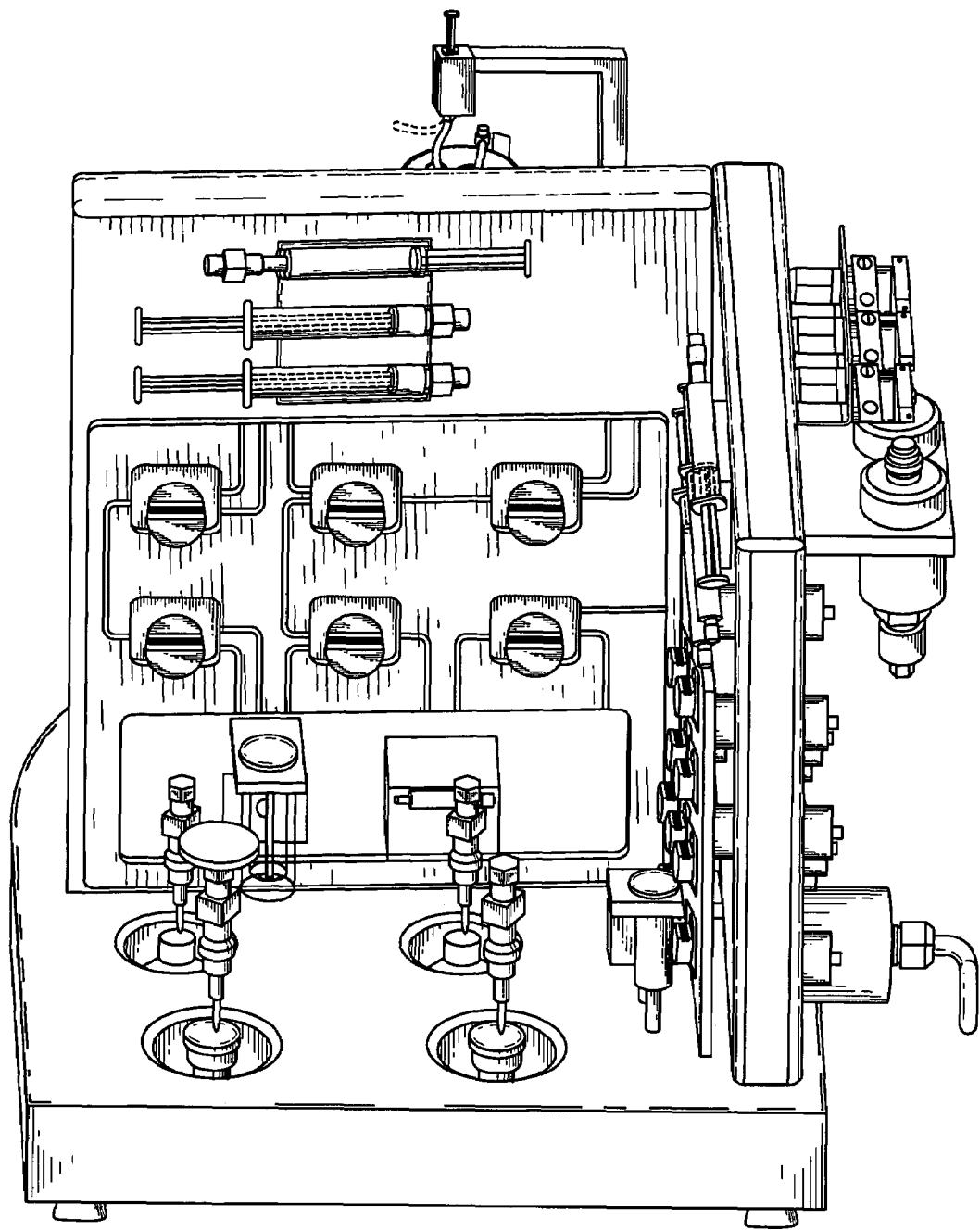
FIG. 8A. View of the purification panel of the automated system.
Figure 8B:
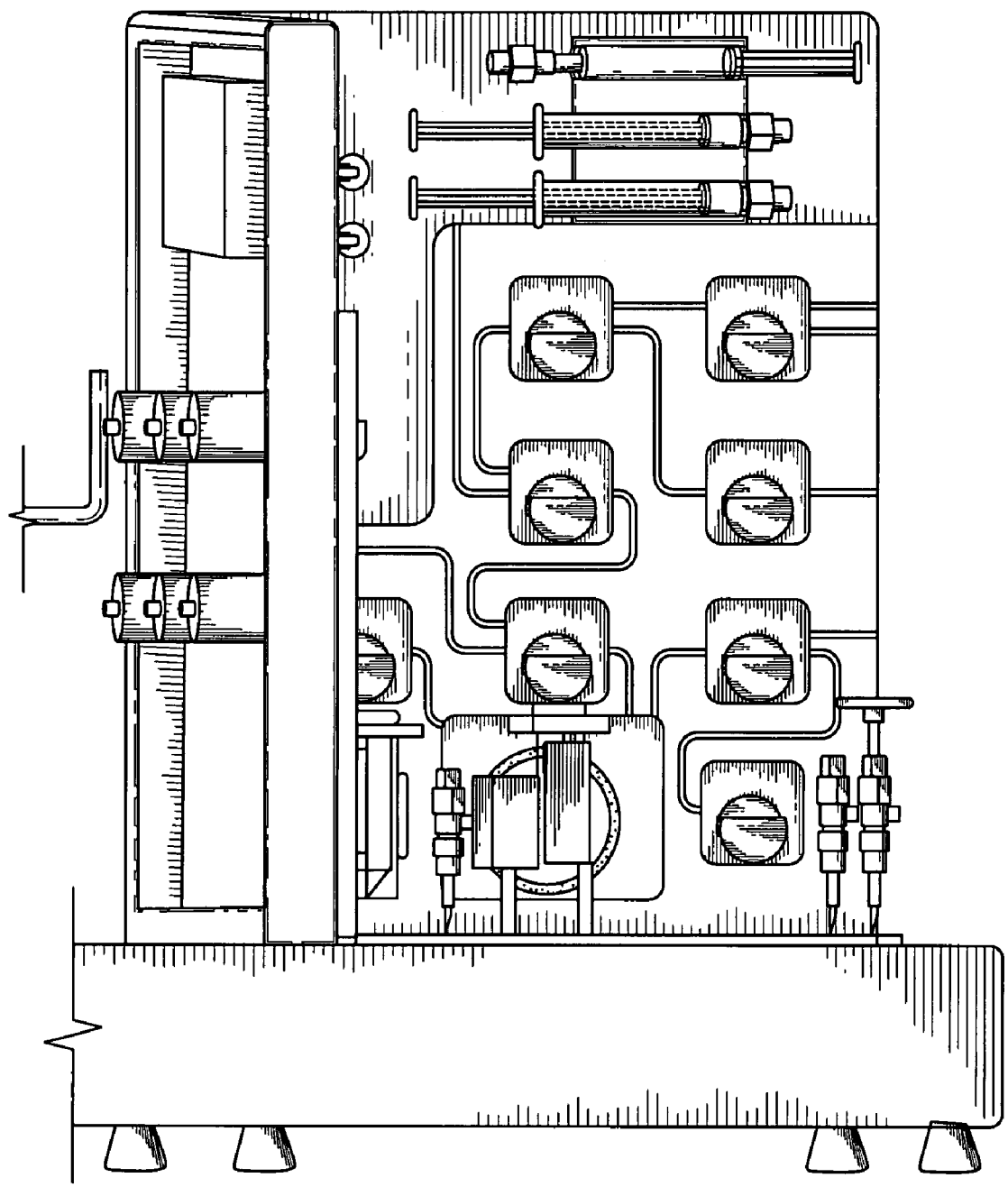
FIG. 8B View of the formulation panel of the automated system.
Figure 10:
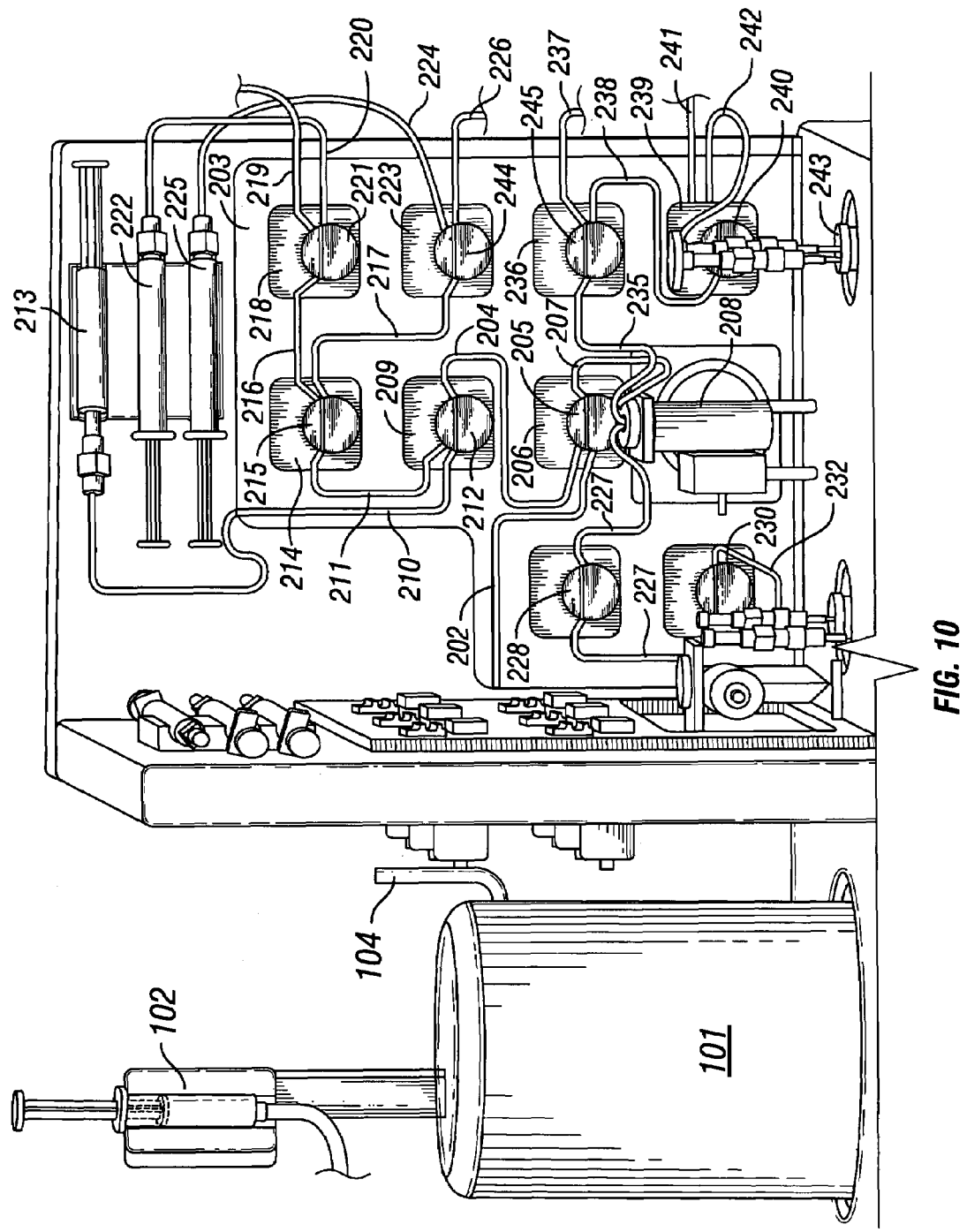
FIG. 10. Profile of the formulation panel with installed removably interchangeable cassette.
Figure 11:
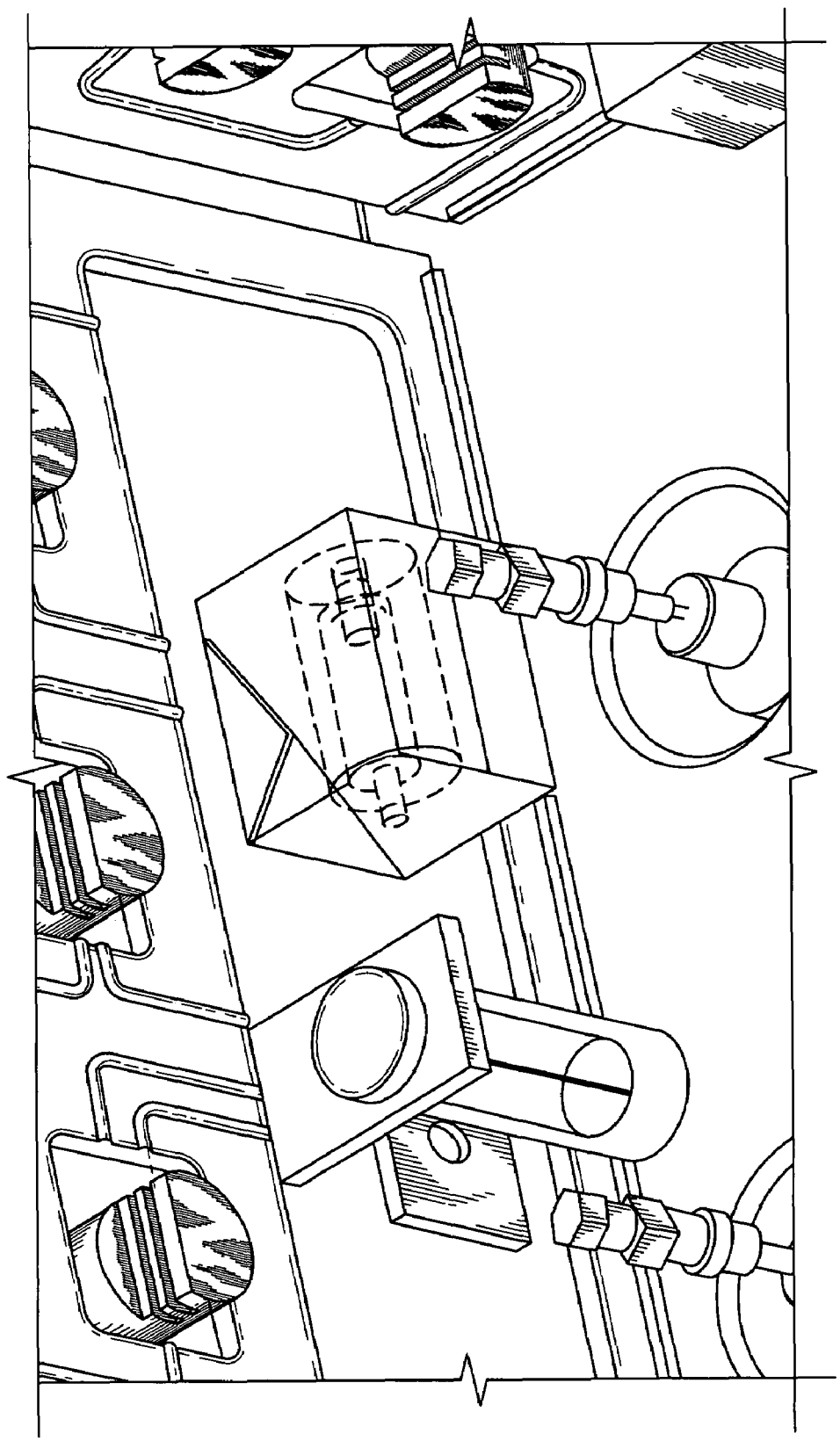
FIG. 11. View of a shielded ion-exchange column installed in the purification panel.
Figure 12B:
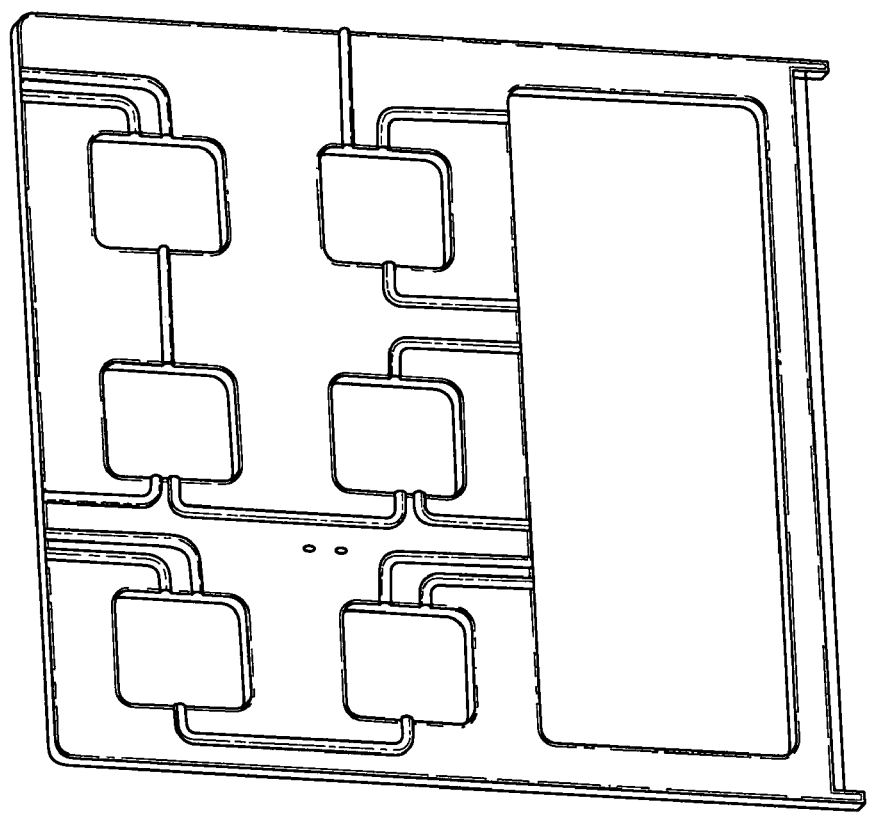
FIG. 12A and FIG. 12B. View of the rigid support for the purification cassette shown with FIG. 12A) and without FIG. 12B) the valve assembly of the purification panel.
Figure 12A:
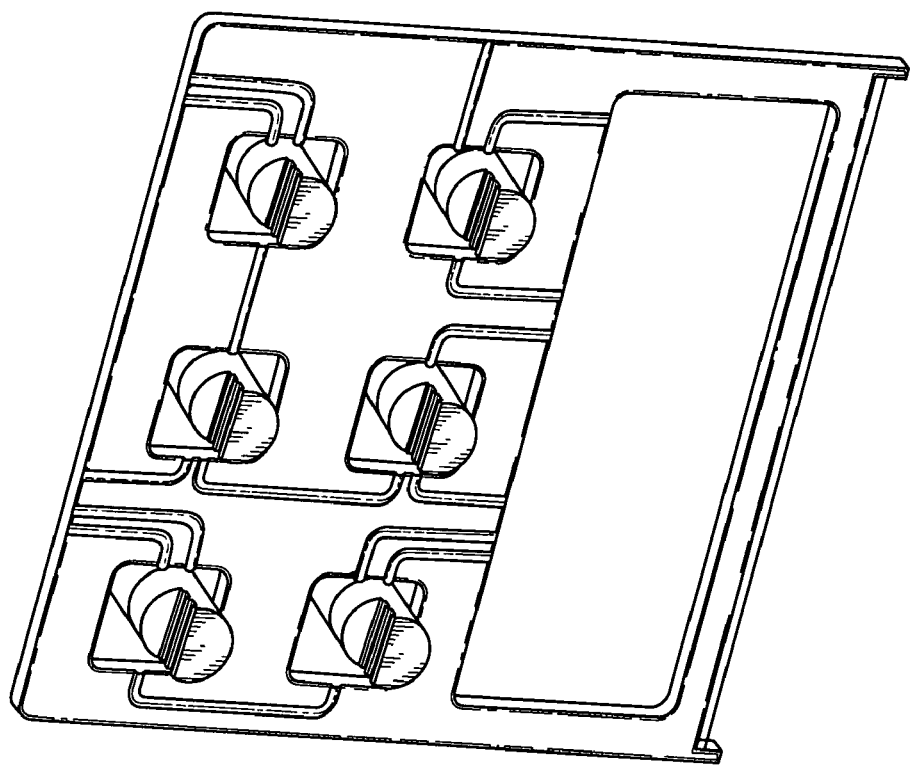
Figure 13B:
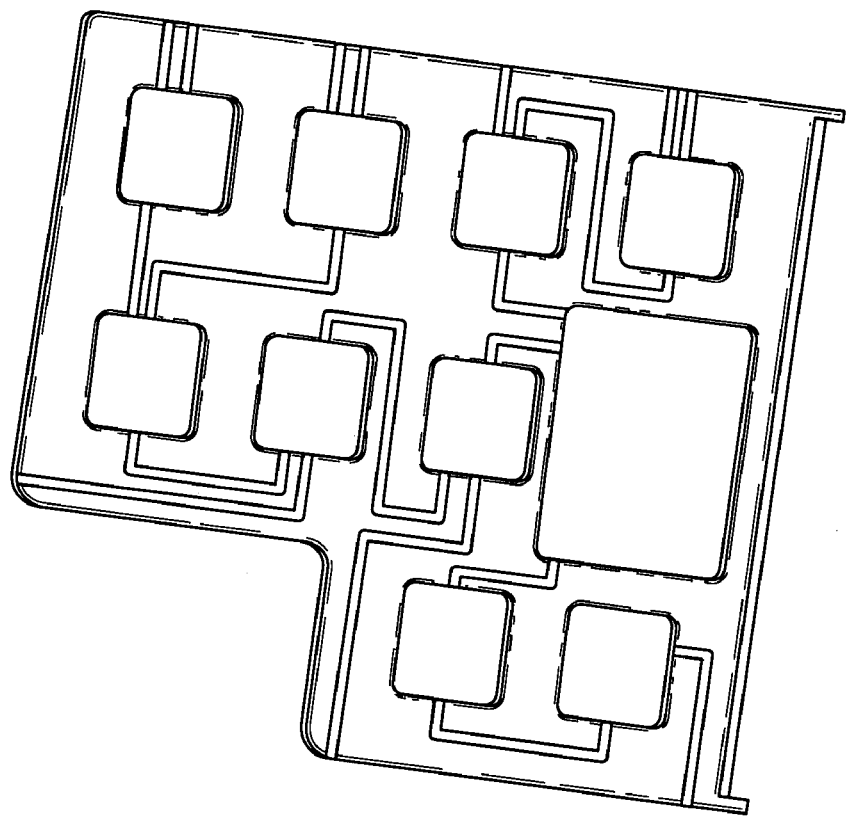
FIG. 13A and FIG. 13B. View of the rigid support for the formulation cassette shown with FIG. 13A) and without FIG. 13B) the valve assembly of the formulation panel.
Figure 13A:
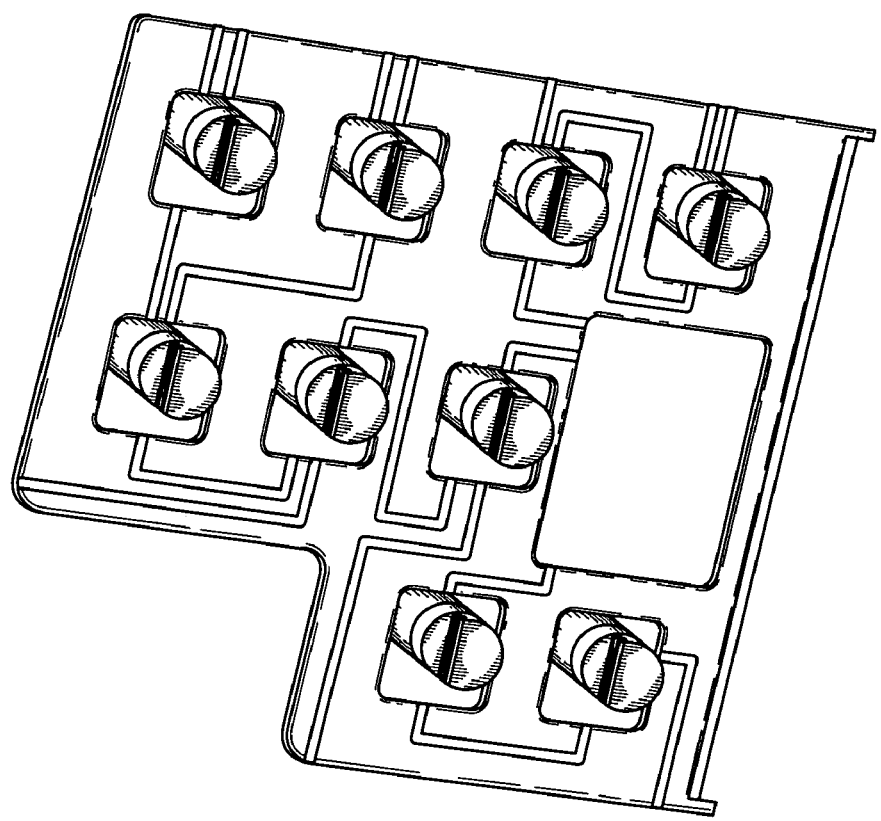
Figure 14:
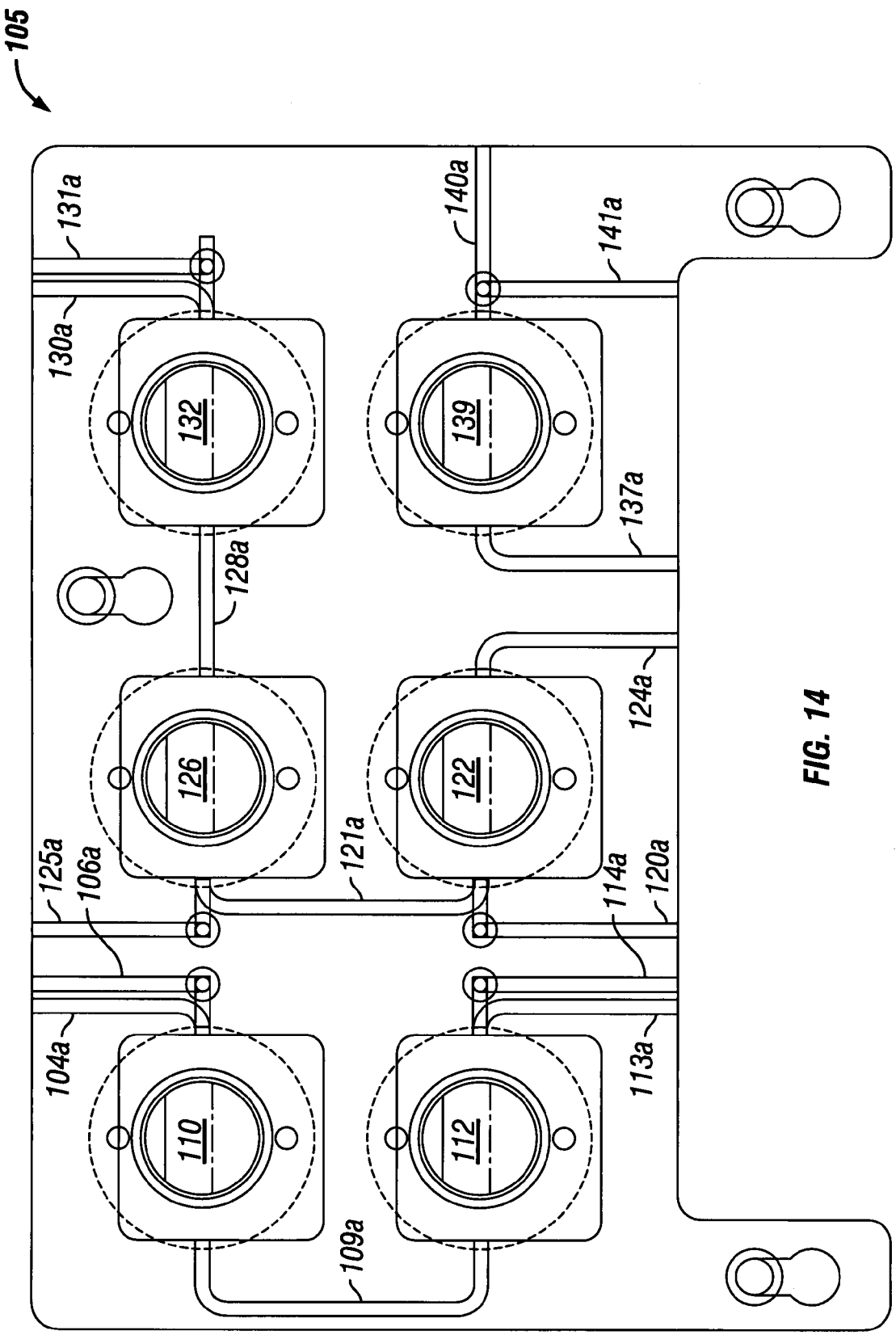
FIG. 14. Schematic of the rigid support for the purification panel, including channels for receiving a network of tubing, shown with the valve assembly of the purification panel.
Figure 15:
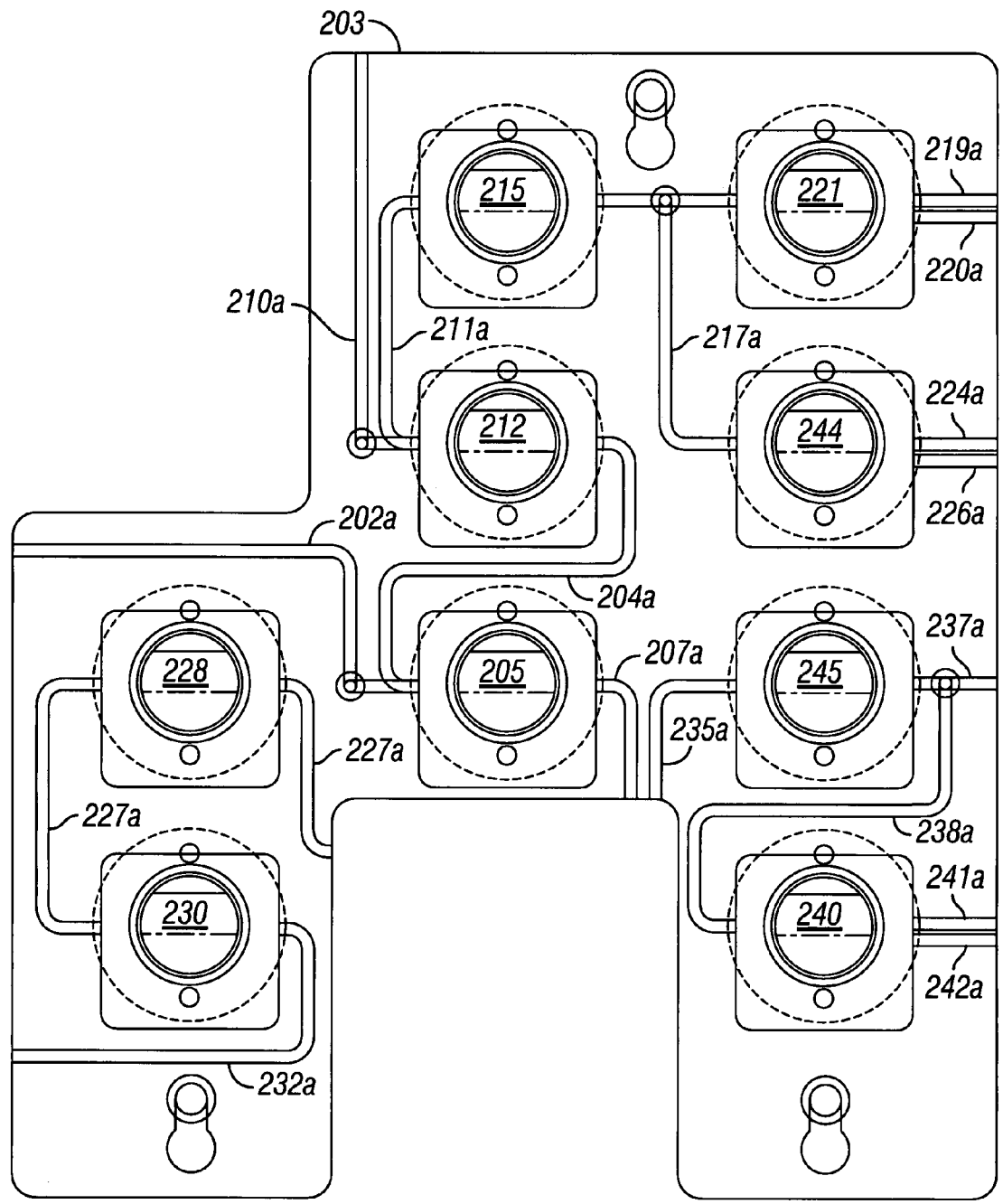
FIG. 15. Schematic for the rigid support for the purification panel, including channels for receiving a network of tubing, shown with the valve assembly of the purification panel.
Figure 16:
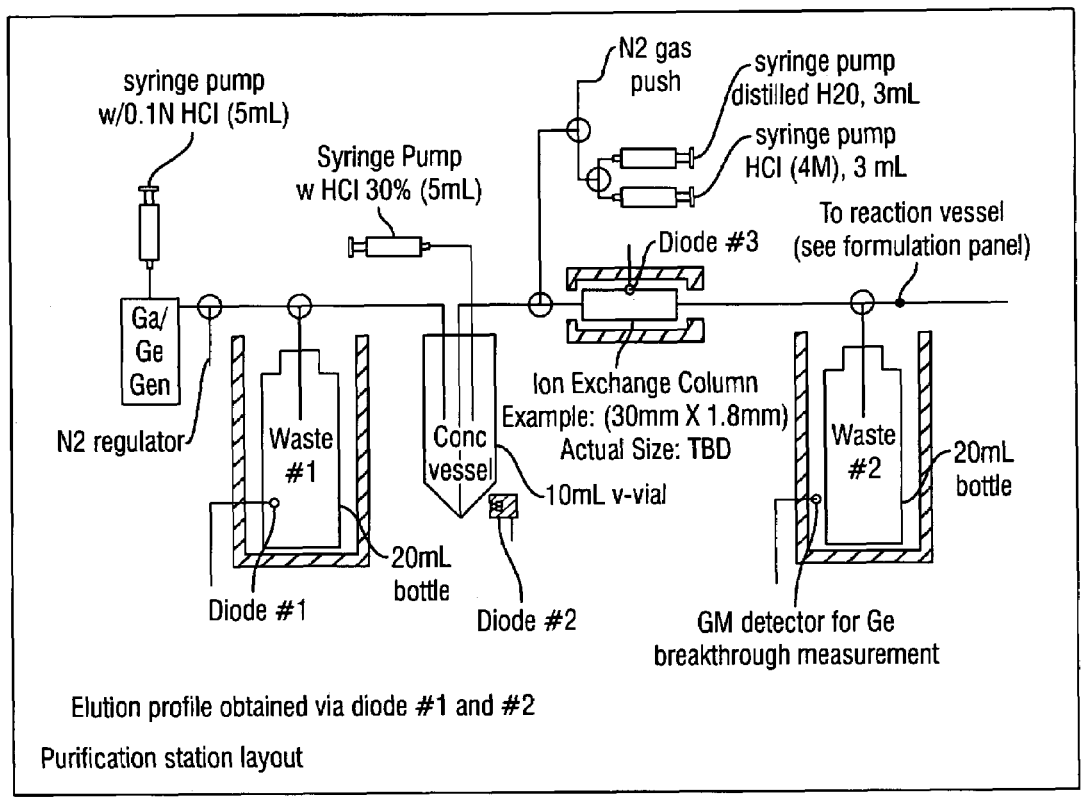
FIG. 16, FIG. 17, FIG. 18, FIG. 19, FIG. 20, FIG. 21, FIG. 22, FIG. 23, and FIG. 24. Diagrams of steps in the purification of a $^{68}$Ga radioisotope.
Figure 17:
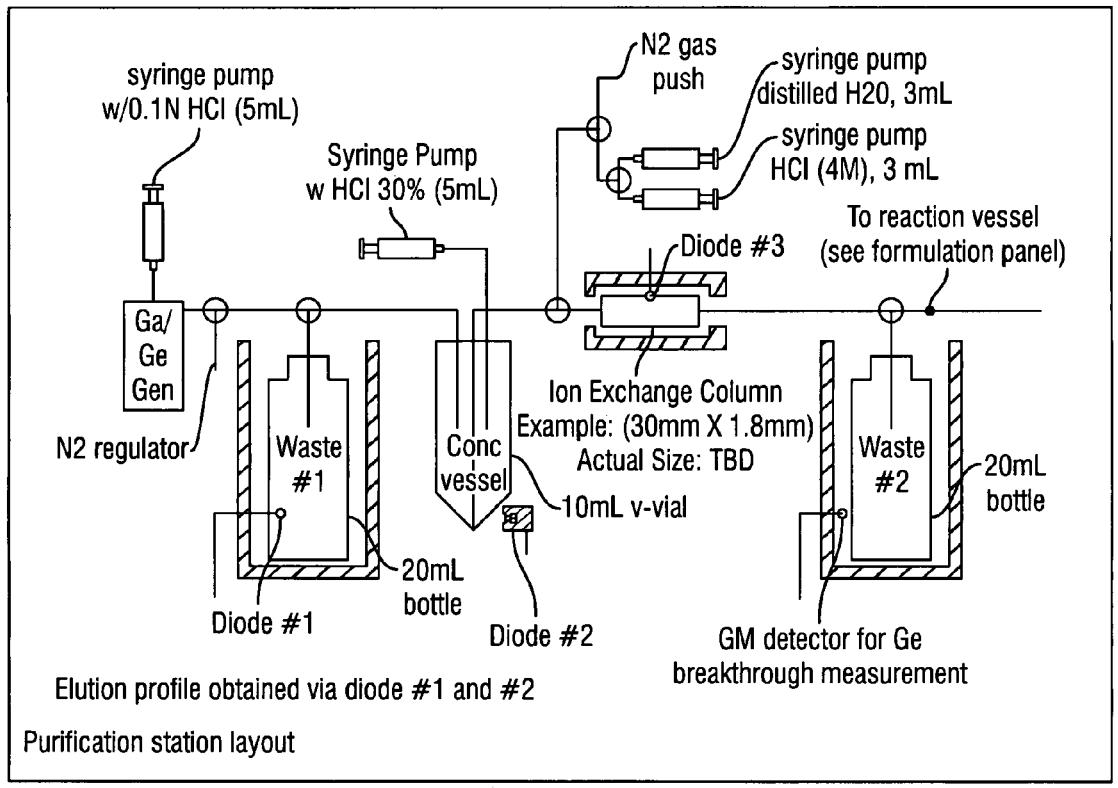
Figure 18:
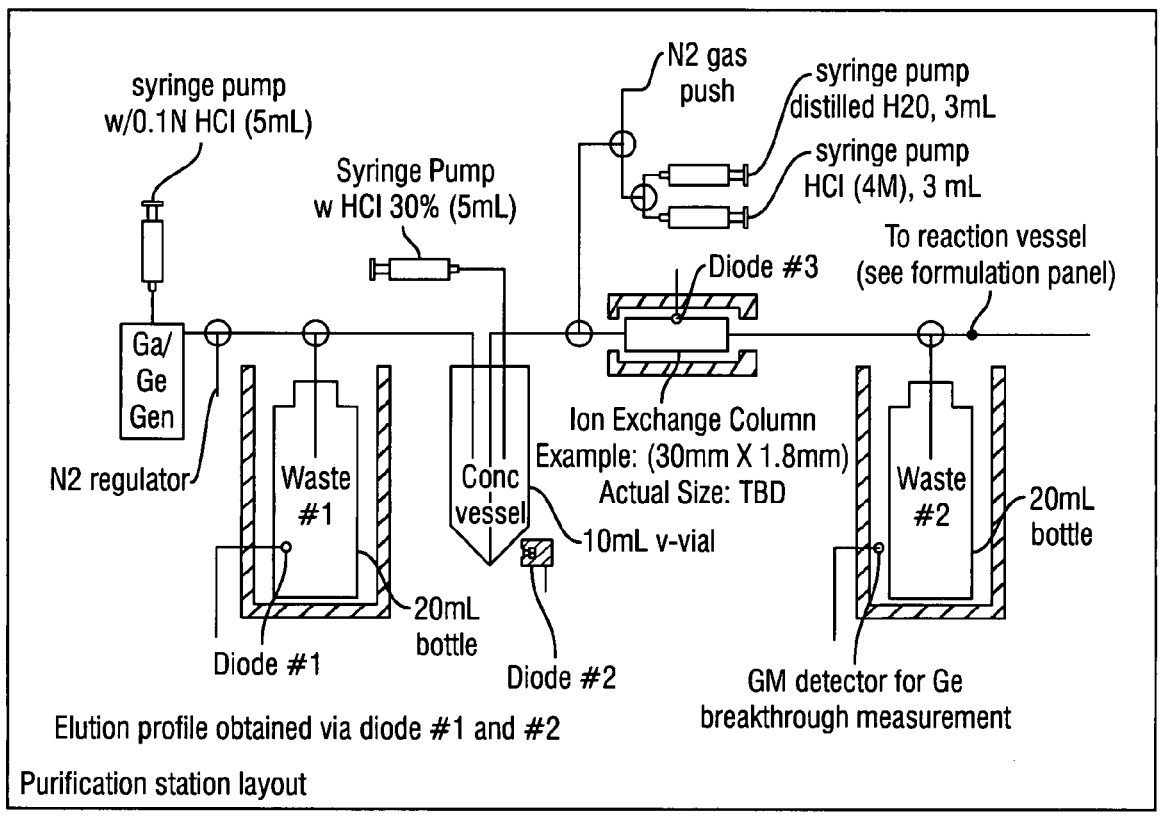
Figure 19:
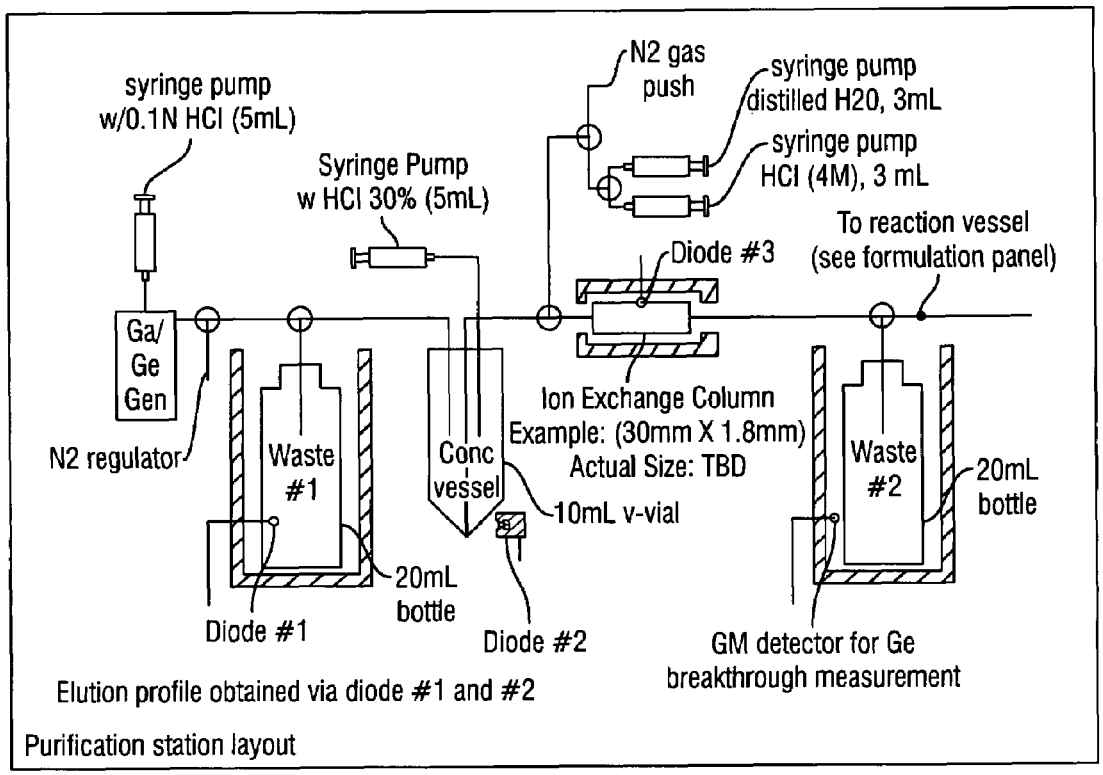
Figure 20:
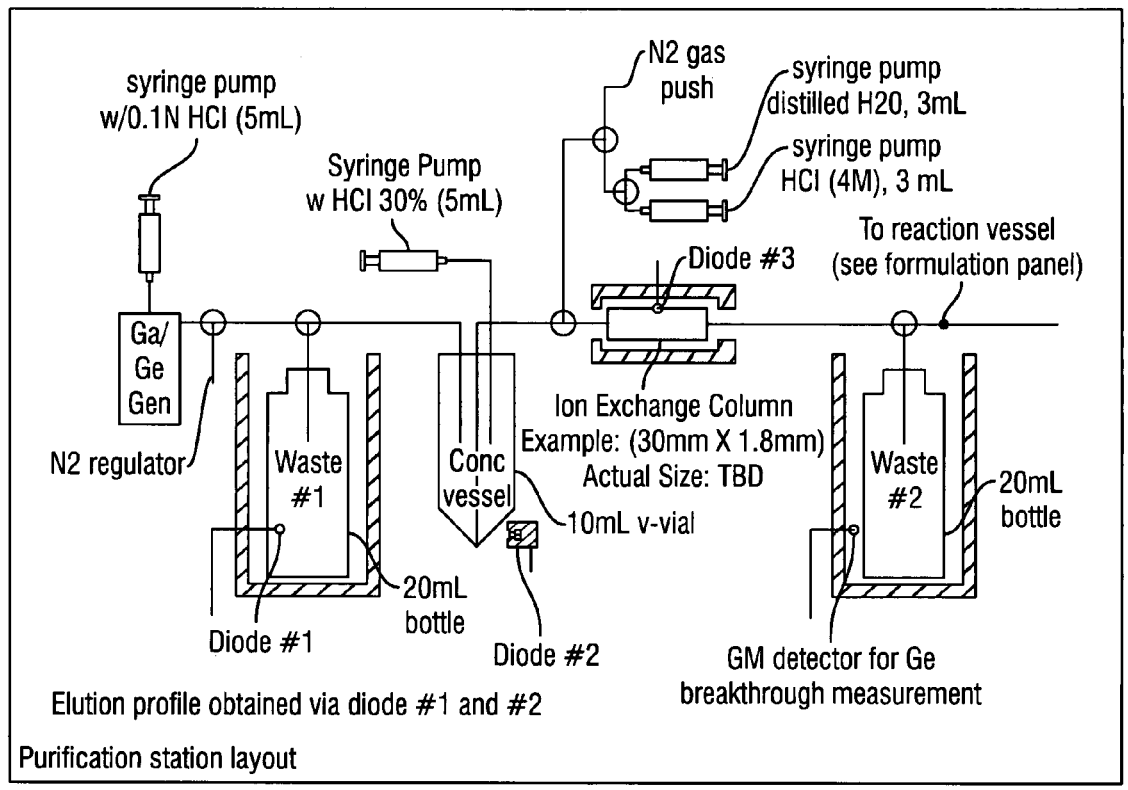
Figure 21:
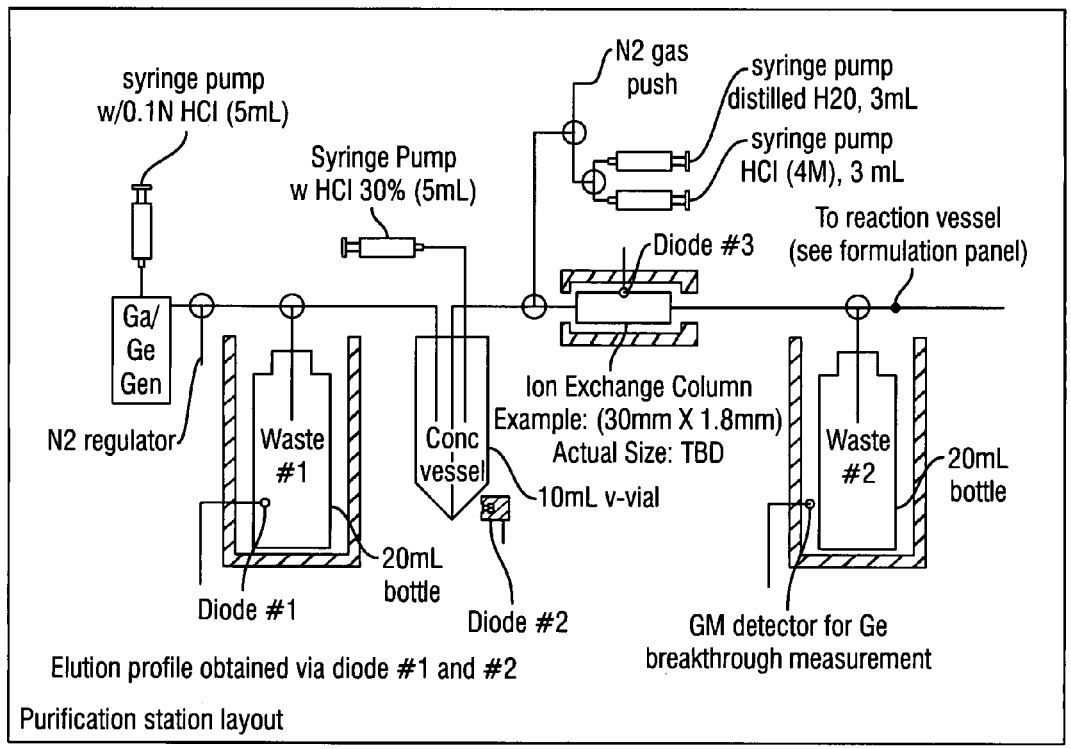
Figure 22:
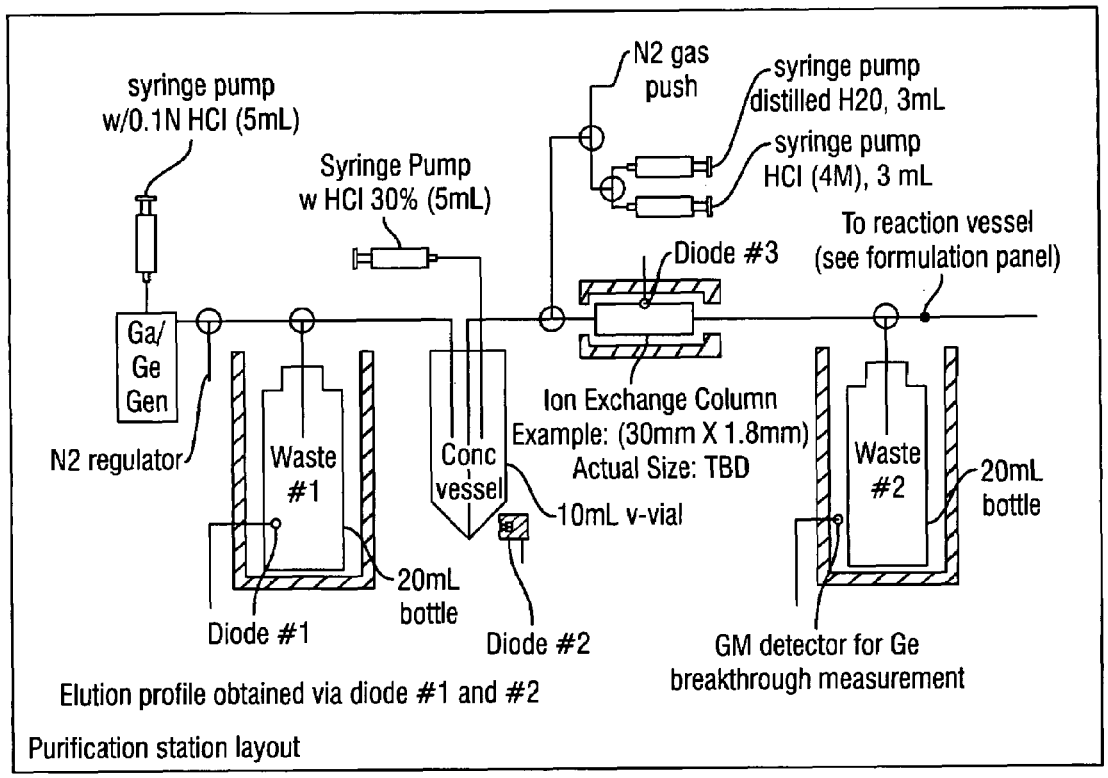
Figure 23:
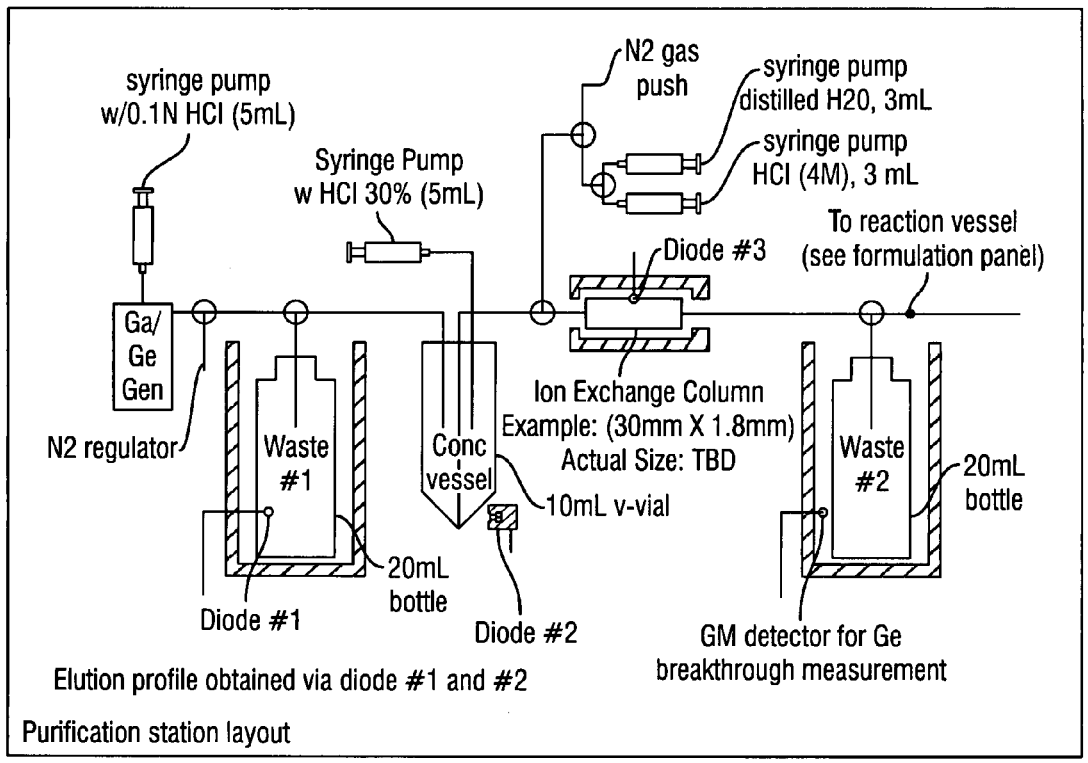
Figure 24:
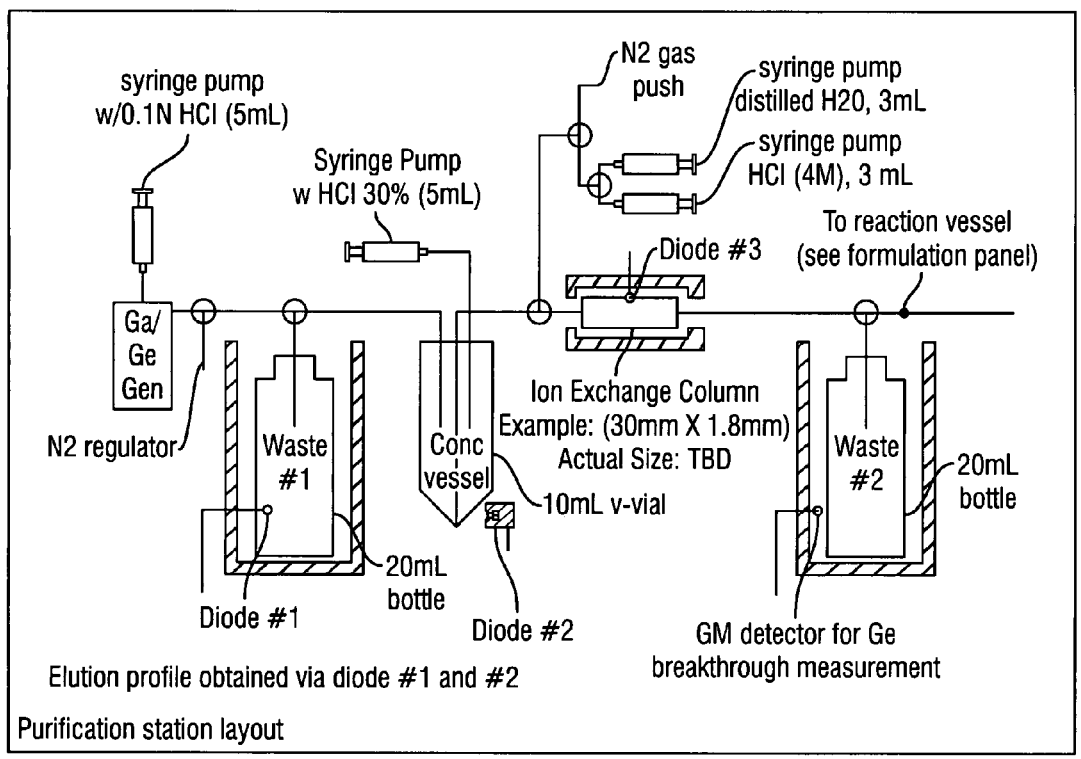
Figure 25:
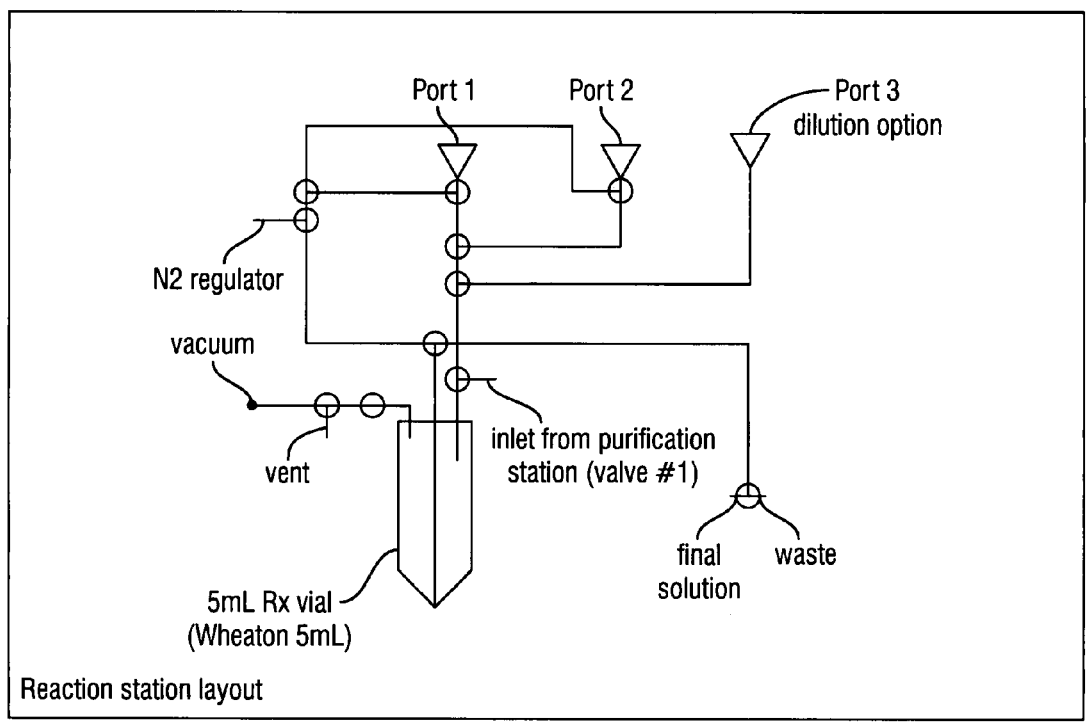
FIG. 25, FIG. 26, FIG. 27, FIG. 28, FIG. 29, FIG. 30, and FIG. 31. Diagrams of steps in the formulation of a $^{68}$Ga radiopharmaceutical.
Figure 26:
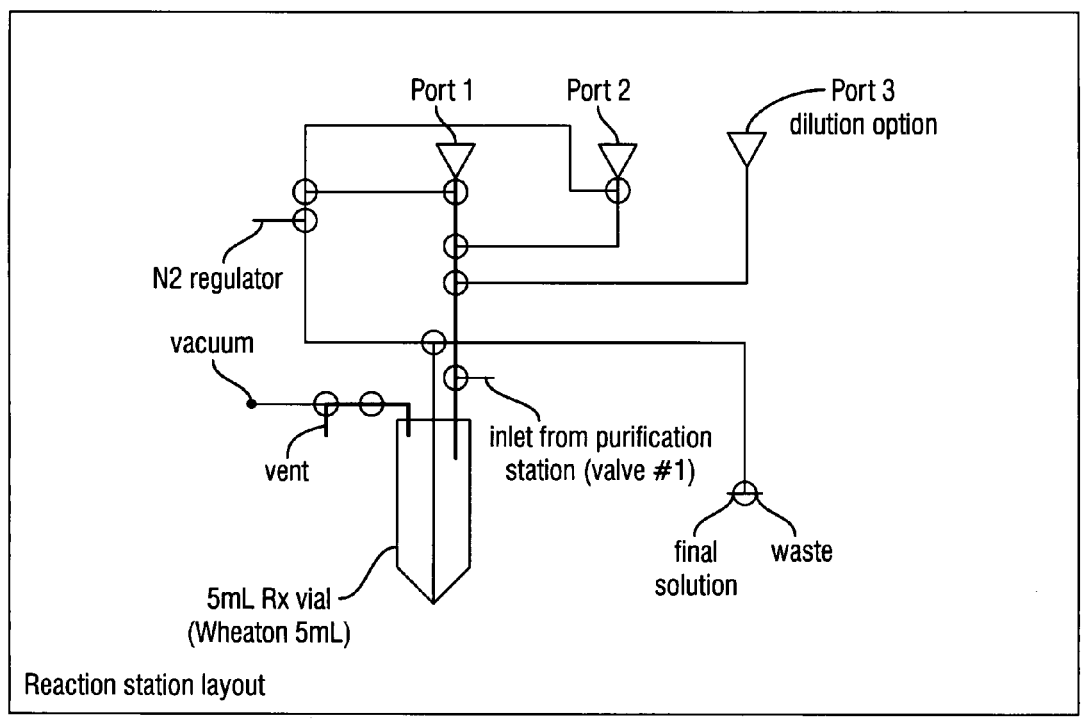
Figure 27:
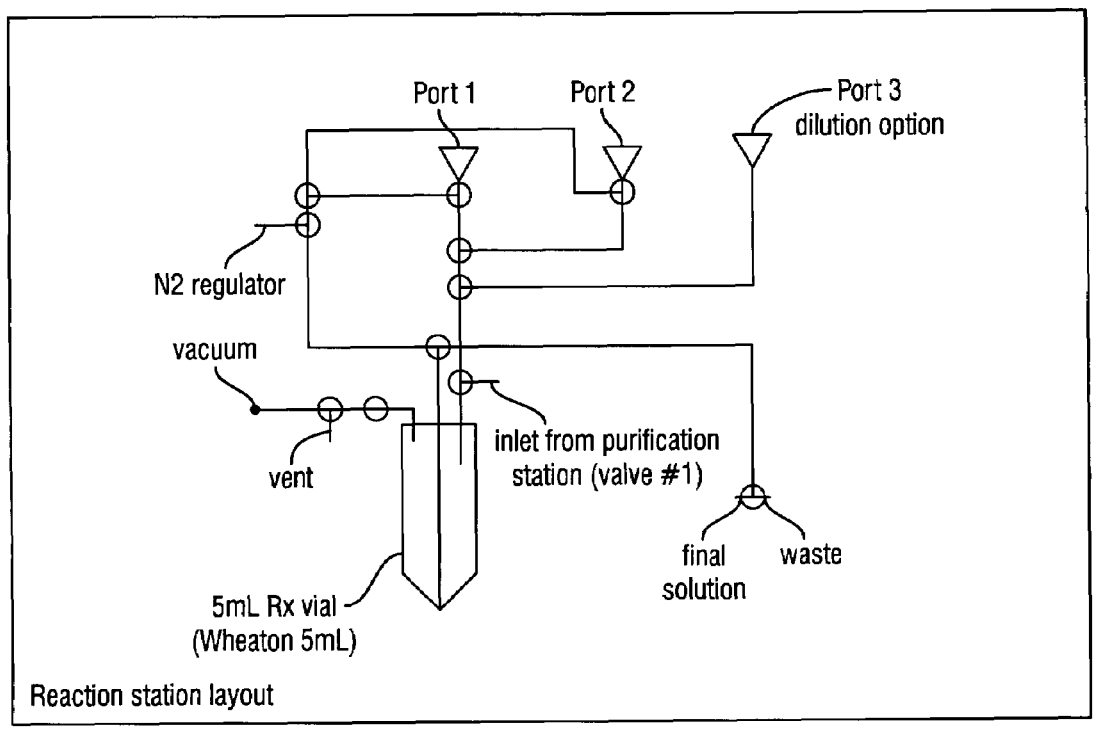
Figure 28:
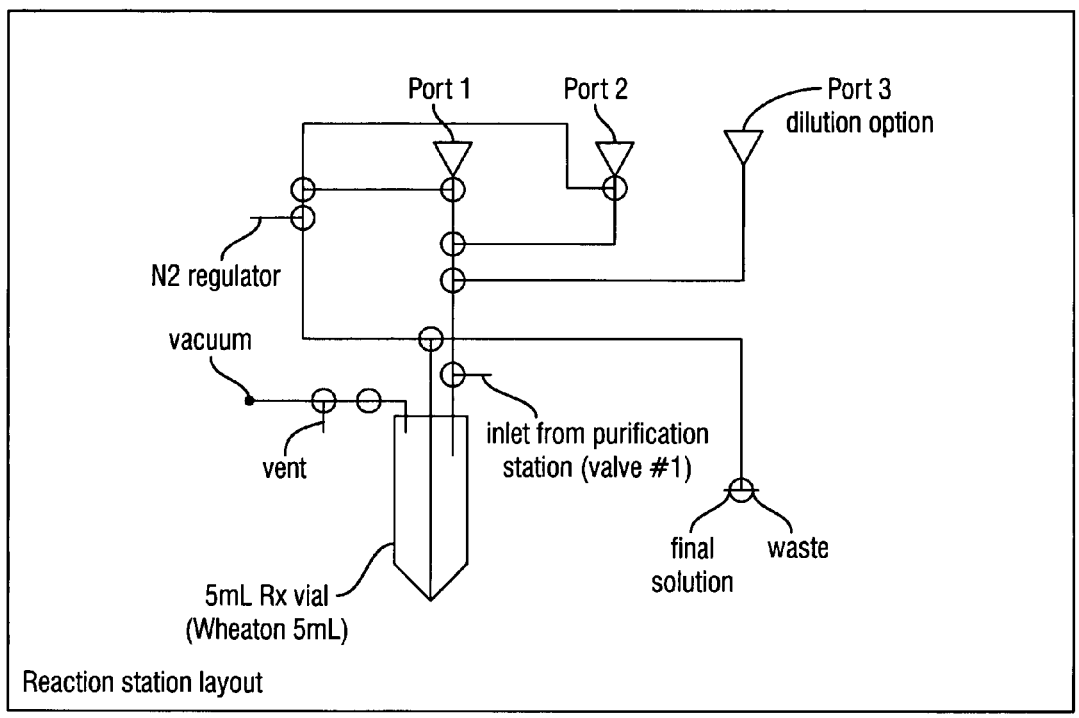
Figure 29:
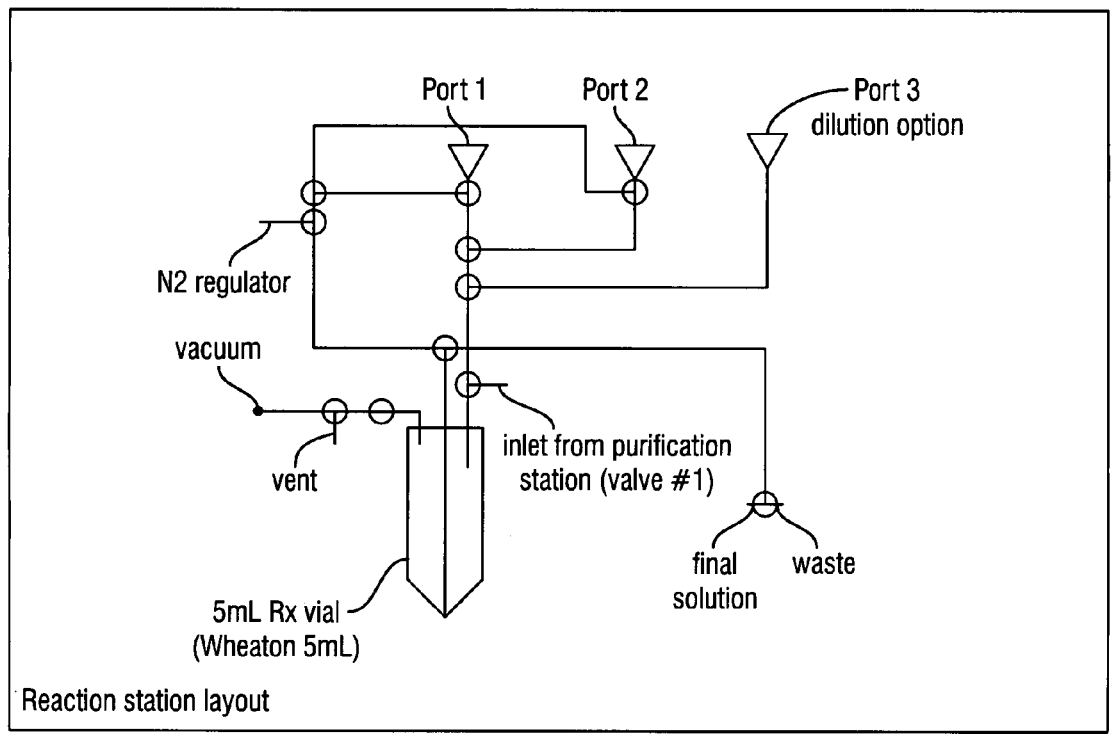
Figure 30:
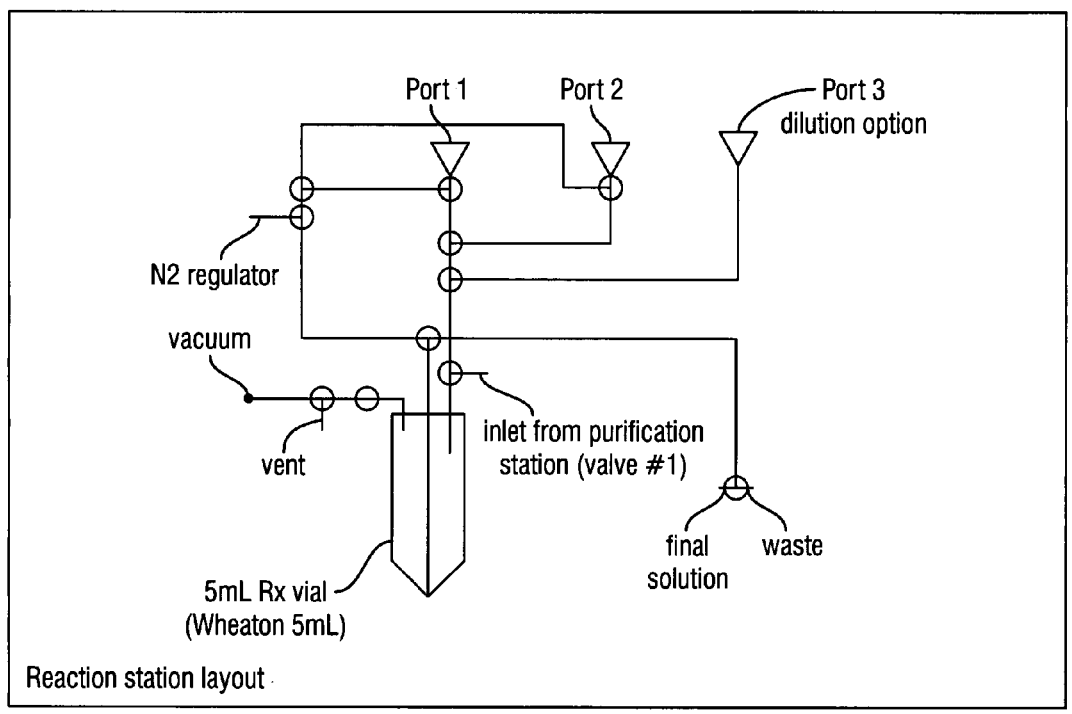
Figure 31:
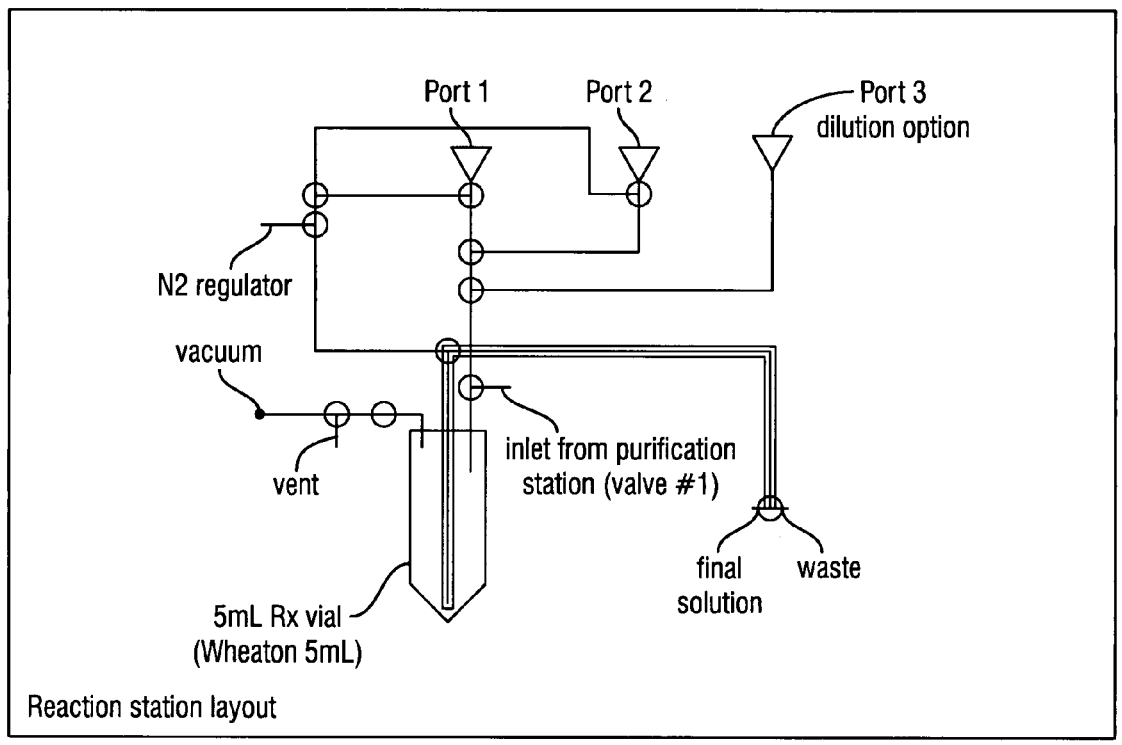
Figure 32:
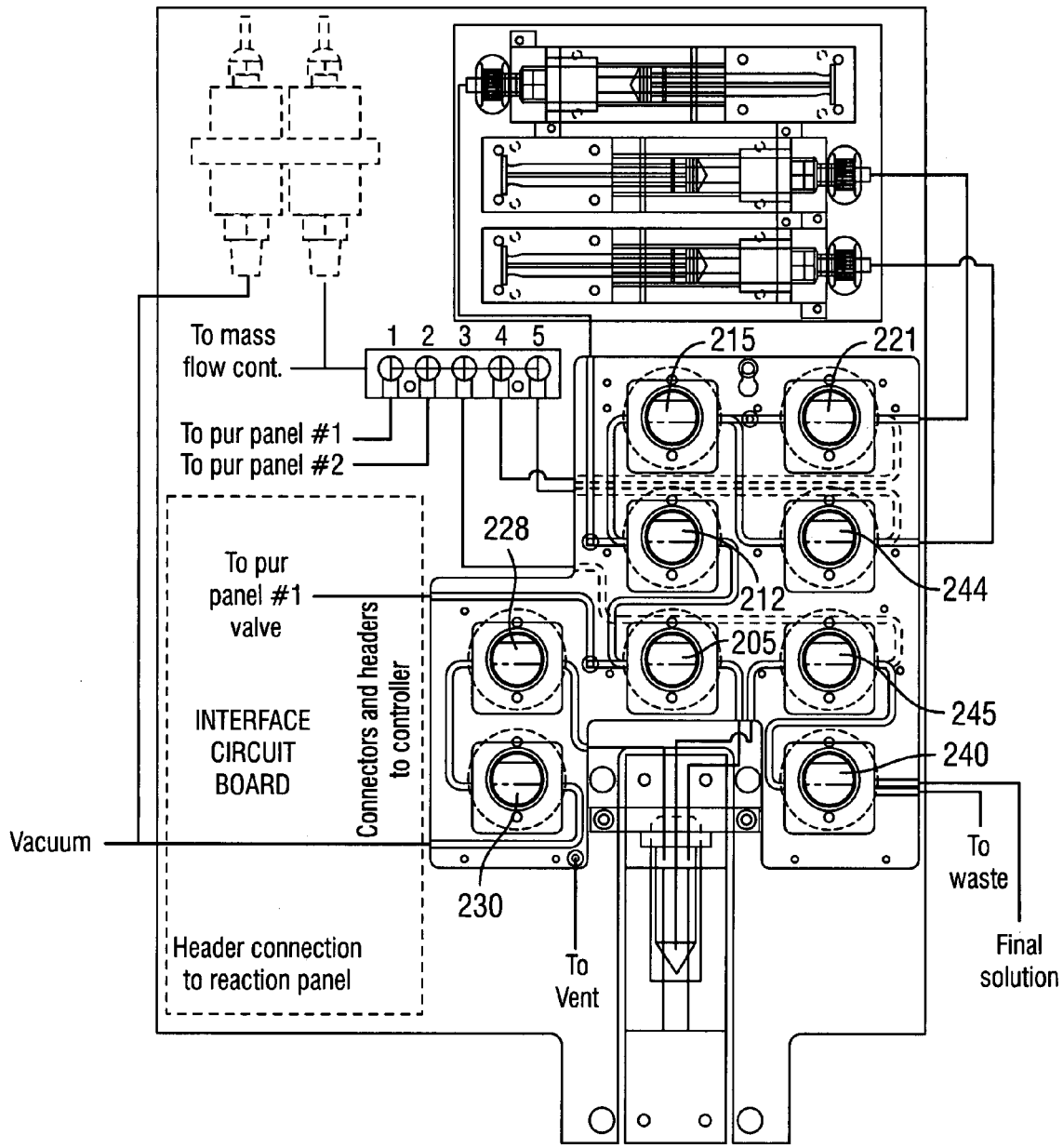
FIG. 32. Schematic of the automated system for radioisotope purification including purification panel tubing network, valves and pumps, and their connections to the gas regulator, fluid receptacles, generator and a formulation panel (reaction vessel).
Figure 33:
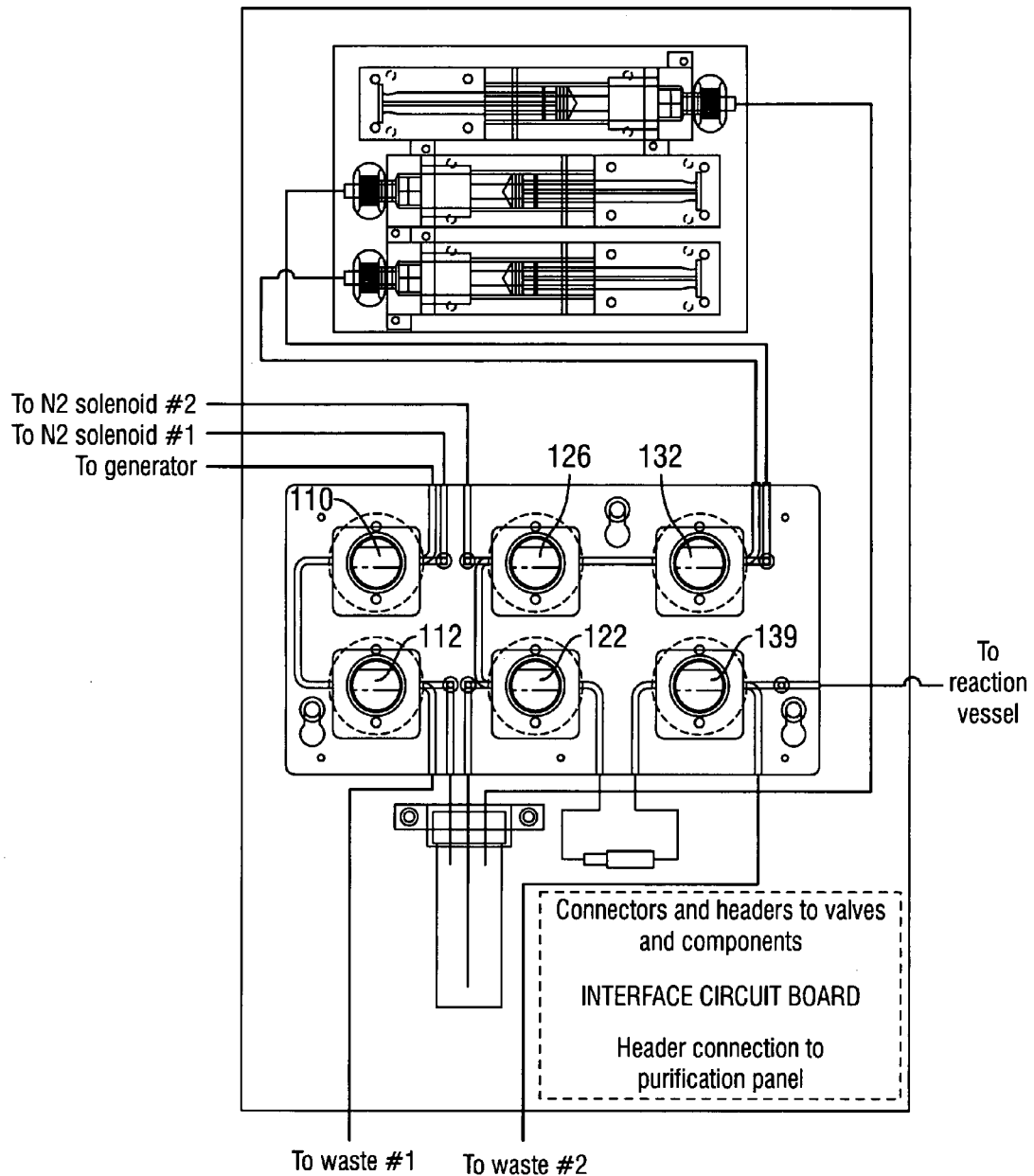
FIG. 33. Schematic of the automated system for radiopharmaceutical formulation including formulation panel tubing network, valves and pumps, and their connections to the gas regulator, fluid receptacles, vacuum pump, vent and a purification panel.

As shown in FIG. 7 and FIG. 10, radionuclide generator 101 is in fluid communication with 10-mL syringe pump 102 via tubing segment 103 such that syringe pump 102 is capable of introducing fluid into generator 101. Alternatively, any appropriate sized syringe pump can be used with the present invention. Most generators are typically designed to behave optimally when eluted with a specific volume of eluent. Radionuclide generator in the present embodiment is a $^{68}$Ge/$^{68}$Ga generator, but in alternative embodiments any suitable generator can be used.

The syringe pumps depicted herein comprise a syringe and a syringe drive which can be automated to deliver fluids into the system under electronic control. However as used herein a "pump" can be any type of mechanism comprising a fluid reservoir coupled to a mechanism for directing the flow of the fluids within a tubing segment. Mechanisms for directing the flow of fluids include syringe drives, peristaltic pumps, gas regulators and the like. The pumps of the present invention are preferably automated, but can be manually operated. In certain embodiments, the fluid reservoir of the pump and any tubing connected to the reservoir are disposable and easily replaced between runs. Therefore, in certain embodiments, the pumps are syringe pumps or the like wherein the fluid reservoir is readily replaceable.

Radionuclide generator 101 is also in fluid communication with tubing segment 104, which is preferably composed of Teflon or other non-reactive materials, such that fluid containing radionuclides can be displaced from the generator 101 directly into tubing segment 104. Tubing segment 104 connects to a planar cassette frame 105 (see FIG. 9) such that a portion of the tubing is mounted on the cassette. In certain embodiments, the tubing is mounted to the cassette by frictional engagement of the tubing with semi-circular recesses in the cassette, however any suitable mounting arrangement known to those skilled in the art can be used.

Figure 9:
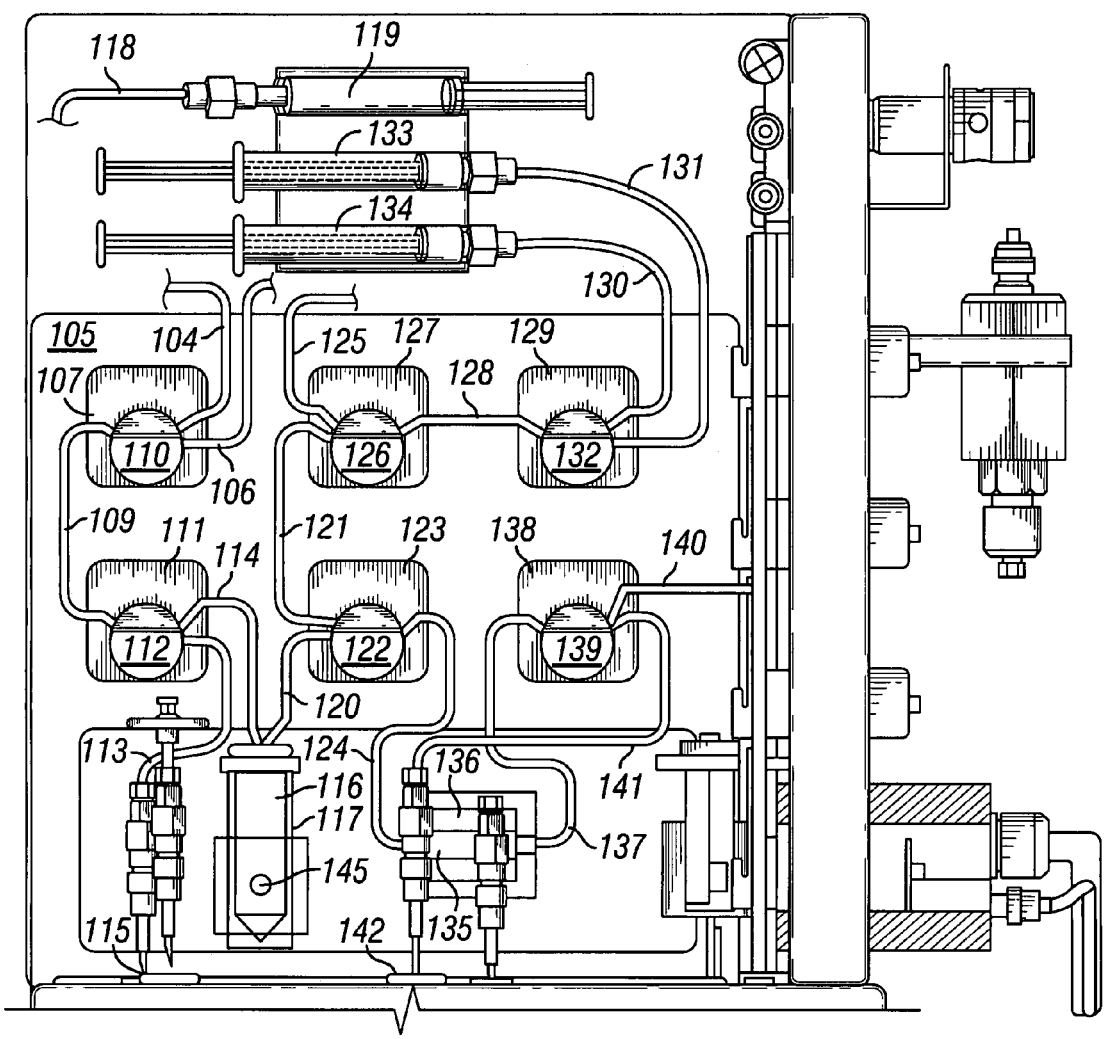
FIG. 9. Profile of the purification panel with an installed removably interchangeable cassette.

With reference to FIG. 9, tubing segment 104 is attached via the cassette to a Y-shaped tubing connector 107. One of the arms of the Y-shaped connecter 107 forms a fluid connection between tubing segment 104 and tubing segment 106. Tubing segment 106 is similarly mounted on cassette 105. At the distal end of tubing segment 106 relative to the Y-connector the tubing segment is attached to nitrogen gas regulator 108 (not shown). The third arm of Y-connector 107 forms a fluid connection with tubing segment 109. Just upstream of Y-connector 107, tubing segments 104 and 106 are embraced by 3-way pinch valve 110. The pinch valve 110 is able to pinch closed either tubing segment 104 or 106 at any given time.

Tubing segment 109 connects to Y-connector 111 which in turn is connected to the proximal ends of tubing segments 113 and 114. Tubing segments 113 and 114 pass through and are regulated by 3-way pinch valve 112. At its distal end, tubing segment 113 connects to 20-mL waste collection vessel 115. Tubing segment 114 connects at its distal end to 10-mL concentration vessel 116 which is surrounded by radiation shielding 117. Alternatively, the radiation shielding 117 could be omitted and shielding provided only for the radiation detectors.

This arrangement of tubing and valves in communication between the generator 101, waste collection vessel 115 and concentration vessel 116 permits the generator to be milked, preferably using a dilute acid solution, and for this radionuclide-containing solution to be transferred to concentration vessel 116. Acid solution used to prime the generator can be transferred to waste collection vessel 115 so as to not dilute the solution milked from the generator. In both transfers, nitrogen gas from gas regulator 108 (not shown) may be used to drive any remaining solution from the tubing and thus eliminate loss of material due to dead volumes.

Although the depicted embodiment uses a nitrogen gas regulator, in alternative embodiments, the apparatus of the present invention may use any appropriate gas to purge liquid from the tubing network. In preferred embodiments, however, the gas used is an inert gas such as argon or nitrogen.

Concentration (reaction) vessel 116 is in further fluid communication with the proximal end of tubing segment 118, which at its distal end connects to 5-mL syringe pump 119.

Once the milked solution is placed in concentration vessel 116, an appropriate amount of concentrated acid solution is delivered from pump 119 to the concentration vessel. Having reached a sufficient molarity of acid the radioisotopic-metal salt thus obtained is ready for the next step in the purification process. The process of delivering and removing radioisotope to and from concentration vessel 116 is monitored by radiation detector diode 145. Such monitoring allows for the generation of elution and yield profiles.

Concentration vessel 116 and its contents are also in fluid communication with the proximal end of tubing segment 120. Tubing segment 120, along with tubing segment 121, passes through 3-way pinch valve 122 before its connection to Y-shaped connector 123. Y-shaped connector 123 is connected in turn to the proximal end of tubing segment 124. The distal end of tubing segment 121, along with tubing segment 125 pass through and are regulated by 3-way valve 126. Tubing segments 121 and 125 are then connected via Y-connector 127 to the proximal end of tubing segment 128. At its distal end, tubing segment 125 is in fluid communication with nitrogen gas regulator 108 (not shown).

Tubing segment 128 in turn is connected at its distal end to Y-connector 129. The remaining arms of Y-connector 129 connect to the proximal ends of tubing segments 130 and 131, respectively, which pass through and are regulated by 3-way pinch valve 132. The distal ends of tubing segments 130 and 131 connect to 5-ml syringe pumps 134 and 133, respectively.

Turning again to tubing segment 124, the distal end of segment 124 connects to the upstream end of a chromatography column 135. Chromatography column 135 is in turn surrounded by radiation shielding 136. Alternatively, the radiation shielding 136 could be omitted and shielding provided only for the radiation detectors. In the depicted arrangement, chromatography column 135 is an ion-exchange column, specifically an anion-exchange column, however, any chromatography column can be used in the present invention that would produce an acceptable chemical separation. Examples of suitable chromatography columns include ion-exchange, including anion-exchange and cation-exchange, reverse-phase chromatography and the like. Preferred anion exchange columns include strong anion exchange columns with counter ions such as $OH^-$, $Cl^-$, $HCO_3^-$ or the like. In certain embodiments, the chromatography column is replaceable or optional.

This arrangement of elements upstream of a purification column, for example a chromatography column 135, permits the separation of desirable $^{68}Ga$ isotopes from contaminating $^{68}Ge$ isotopes that may also be present when radioisotopic solution is milked from the generator. After acid treatment in the concentration vessel, the mixed radioisotopic solution can be drawn out of concentration vessel 116 via tubing segment 120 and 124 and delivered to chromatography column 135. Both the desired $^{68}GaCl_3$ and contaminating $^{68}Ge$ and other trace metals bind to the column. An acid solution such as 4 M HCl can be used to elute $^{68}Ge$ and other contaminating trace metals from the ion-exchange column while retaining $^{68}Ga$. The acid solution can be delivered from syringe pump 133 to chromatography column 135 via tubing segments 131, 128, 121 and 124. A non-acidic solution such as distilled $H_2O$ can be used to elute $^{68}Ga$ from the chromatography column 135. For example, the non-acidic solution can be delivered from syringe pump 134 to chromatography column 135 via tubing segments 130, 128, 121 and 124.

The downstream end of column 135 is shown in fluid communication with the proximal end of tubing segment 137. The distal end of tubing segment 137 is connected to Y-connector 138. The remaining arms of Y-connector 138 are in fluid communication with tubing segments 140 and 141 respectively. As depicted, the distal end of tubing segment 140 is in fluid communication with the formulation panel of the apparatus. However, in alternate embodiments purified $^{68}Ga$ compounds could be collected in an appropriate collection vessel directly from the distal end of tubing segment 140. The distal end of tubing segment 141 is in fluid communication with waste collection vessel 142, a 20-mL body recessed in platform similar to waste collection vessel 115. The waste collection vessel is available to collect the eluate from both the initial loading of the chromatography column and from the acid wash of the column when contaminants are removed.

Tubing segments 104, 106, 109, 113, 114, 120, 121, 124, 125, 128, 130, 131, 137, 140 and 141 are all at least partially mounted on cassette frame 105 as described above with reference to tubing segment 104. In the embodiment depicted in the figures, the tubing is pressed into semi-circular channels 104a, 106a, 109a, 113a, 114a, 120a, 121a, 124a, 125a, 128a, 130a, 131a, 137a, 140a and 141a (see FIG. 14) in the rigid support structure of the cassette, however any appropriate means of mounting the tubing known to those skilled in the art can be used to achieve a similar result. The tubing can be removed from the rigid support structure and replaced with new tubing, but in certain embodiments the entire cassette is removed from the device and replaced with a new cassette when it is necessary to replace the tubing. The tubing is preferably composed of Teflon or other suitable non-reactive organic or inorganic materials. When the tubing is composed of an organic material, it will be necessary to exchange the tubing periodically due to accelerated tubing breakdown caused by exposure to radioactive materials. In other embodiments, the cassette can also be exchanged when it is desired to use a different radioisotopic purification protocol. The cassette can then be reused or disposed of, depending on the needs and objectives of the user.

The pinch valves, 110, 112, 122, 126, 132 and 139 are solenoid-type pinch valves that are electronically controlled by the control system via software. Those of ordinary skill in the art will readily recognize that any type of valve known in the art can be used in the present invention. The use of pinch valves and compressible tubing make the exchange of one cassette for another a simple and quick procedure. The tubing can be quickly removed from engagement with the pinch valves without exposing the user to the contents of the tubing. Once the connections made by the tubing to other elements of the apparatus are disconnected, the cassette can be removed from the apparatus and can be replaced by the new cassette. The new cassette can include color-coding or another type of labeling that indicates to the user where various tubing connections should be made with the apparatus. During installation connections are made to the concentration vessel, chromatography column and the like. Also during installation, the appropriate tubing segments are placed in engagement with the appropriate channels in the valves (pinch or otherwise). Color coding or other marking may be used to indicate how the tubing segments should engage the pinch valves for appropriate operation of the device.

The apparatus of the present invention further comprises radiation detectors for monitoring during a purification process the radioactive emissions present at various sections of the apparatus. In certain embodiments, these detectors can permit an operator or a computer to determine when to implement the next step in the purification process. In other embodiments, the detectors monitor the progress and yield of the purification process. The embodiment depicted in the examples uses radiation detectors that are diodes. Realtime radiation detectors such as diodes, Geiger-Mueller counters, plastic scintillators or the like are preferred for use with the present invention, however any device capable of detecting radiation that is known to those skilled in the art can be used.

One such detector is diode 144 (not shown) which is placed such that it can monitor the amount of radiation emanating from the contents of waste collection vessel 115. A second diode 145 is placed to monitor the radiation emanating from the contents of concentration vessel 116. A third diode 146 (not shown) is placed to monitor the radiation emanating from chromatography column 135. Finally, a fourth diode 147 (not shown) is placed to monitor the radiation emanating from waste collection vessel 142, which thereby permits monitoring the extent of $^{68}$Ge breakthrough from the generator.

The valves, network of tubing or other elements of the purification panel can be reconfigured as required for a particular purification protocol. Numerous such arrangements will be apparent to one of skill in the art in light of the present disclosure.

Radiopharmaceutical Formulation Panel

The formulation panel or section of the present invention comprises a valve assembly, and in certain embodiments can comprise one or more of the following: receptacles for one or more replaceable automated pump reservoirs, one or more non-replaceable pumps, one or more ports for the injection or extraction of fluids, one or more reaction or fluid collection vessels mounted on the panel, one or more radiation sensors, one or more temperature sensors, one or more gas regulators, and one or more programmable logic controllers or other means of controlling one or more actuators associated with the formulation panel. In certain embodiments, the formulation panel further includes a means for mounting a replaceably interchangeable cassette comprising a network of tubing. Alternatively the formulation panel can provide an alternate means for mounting a network of replaceable tubing.

As shown in FIG. 10, a formulation cassette is mounted on the formulation panel and is in fluid communication with the purification panel via tubing segment 140. Tubing segment 140 is connected to tubing segment 202 via a connector 201 (not shown). Tubing segment 202 is mounted on cassette frame 203 and along with tubing segment 204 is regulated by 3-way pinch valve 205. Tubing segments 202 and 204 are connected to separate arms of Y-connector 206. The third arm of Y-connector 206 is connected to tubing segment 207 at its proximal end. The proximal end of 207 is mounted to cassette 203 while its distal end leaves the cassette frame to form a fluid connection with reaction or fluid collection vessel 208.

Tubing segments 202 and 207 serve to transmit purified radioisotope from the purification panel to the reaction vessel 208. Thus tubing segment 207 preferably is placed such that the end of the tubing is well above the expected fluid level of the contents of reaction vessel 208 in order to prevent back flow of the contents of the vessel.

Returning to tubing segment 204, the proximal end is connected to Y-connector 206 while its distal end is connected to Y-connector 209 which is connected at its remaining arms to the proximal ends of tubing segments 210 and 211. Tubing segments are regulated by 3-way pinch valve 212. The distal end of tubing segment 210 is in fluid communication with syringe pump 213. The distal end of tubing segment 211 is connected to Y-connector 214 which connects at its remaining arms to tubing segments 216 and 217 respectively. Tubing segments 216 and 217 are regulated at their proximal ends by 3-way pinch valve 215. The distal end of tubing segment 216 is connected to Y-connector 218. The remaining arms of Y-connector 218 are in fluid communication with the proximal ends of tubing segments 219 and 220. Tubing segments 219 and 220 are regulated by 3-way pinch valve 221. At its distal end tubing segment 219 is connected to nitrogen gas regulator 108 (not shown). The distal end of tubing segment 220 is in fluid communication with syringe pump 222.

Tubing segment 217 is attached at its distal end to Y-connector 223, which in turn connects to the proximal ends of tubing segments 224 and 226. The distal end of tubing segment 224 is in fluid communication with syringe pump 225. Tubing segments 224 and 226 are regulated by 3-way pinch valve 244. The distal end of tubing segment 226 is in fluid communication with nitrogen gas regulator 108 (not shown).

Syringe pumps 213, 222 and 225 serve to permit the introduction of various fluids or reagents into reaction vessel 208. Once the fluids or reagents are injected by the pumps, pinch valves 212, 215 and 221 can be used to open the appropriate tubing segments to purge the tubing lines of fluid using nitrogen gas originating from nitrogen gas regulator 108 (not shown).

Reaction vessel 208 is also connected to tubing segment 227. Tubing segment 227, like tubing segment 207 is preferably placed such that the tubing is well above the expected fluid level of the contents of reaction vessel 208. Tubing segment 227 passes through and is regulated by 2-way pinch valve 228. At its distal end tubing segment 227 connects to Y-connector 229 (shown in FIG. 10 as a direct connector). Y-connector 229 is connected at its remaining arms to tubing segments 231 (not shown) and 232 which are regulated by 3-way pinch valve 230 (shown in FIG. 10 as a 2-way pinch valve). At its distal end tubing segment 231 (not shown) is connected to vacuum pump 233 (not shown). Tubing segment 232 at its distal end is connected to a vent 234 (not shown). The connection of the reaction vessel via tubing segments 227 and 231 (not shown) to vacuum pump 233 (not shown) permits the system to draw fluids from the purification panel to the reaction vessel. Valves 228 and 230 regulate the application of vacuum and permit the system to be vented after application of a vacuum.

Further with relation to the reaction vessel 208, the proximal end of tubing segment 235 is placed at or near the bottom of the vessel 208. At its distal end, tubing segment 235 connects to Y-connector 236. The remaining arms of Y-connector 236 are connected to the proximal ends of tubing segments 237 and 238. Tubing segments 237 and 238 are regulated by 3-way pinch valve 245. The distal end of the tubing segment 237 is in fluid communication with nitrogen gas regulator 108 (not shown). The distal end of tubing segment 238 connects to Y-connector 239, which in turn further connects to the proximal ends of tubing segments 241 and 242. Tubing segments 241 and 242 are regulated by 3-way valve 240. The final reaction product is delivered to the user at the distal end of tubing segment 241 and can be placed in fluid communication with any appropriate receptacle for receiving the final radiopharmaceutical solution. The distal end of tubing segment 242 is in fluid communication with waste collection vessel 243.

In certain embodiments, the apparatus further comprises a heating mechanism for heating the contents of reaction vessel 208. The apparatus can additionally comprise a temperature sensor that can detect the temperature of the contents of the reaction vessel. The temperature sensor, such as a thermocouple or the like, can provide a reading of the reaction temperature within the vessel and alternatively or additionally can control output to a heater via a closed feedback loop. Many appropriate heating mechanisms will be apparent to those skilled in the art, including infrared lamps and the like. In certain embodiments the heating mechanism can be used to promote reactions involved in the formulation of the radioisotope. Additionally or alternatively, the heating mechanism can also be useful for reducing the amount of solvent in which the radioisotope is suspended, particularly in embodiments where purification by column purification has not been used to concentrate the radioisotope.

Depending on the type of reaction required therefore, the preferred apparatus of the present invention can apply heat to the contents of the reaction vessel. The apparatus of the present invention can also apply a vacuum to the contents of the reaction vessel for the purposes of evaporating solvent, for promoting chemical reactions and the like. The apparatus permits the application of a vacuum via tubing segment 231 (not shown). When it is time to release the vacuum, e.g. so that the contents of the reaction vessel can be removed, the vacuum is released via tubing segment 232 (not shown) and vent 234 (not shown). Finally, the contents of the reaction vessel can be stirred or agitated or a gaseous reagent can be added, as required, through the introduction of gas via tubing segments 237 and 235. When gas is introduced for the purposes of agitation, it will be generally preferred to use an inert gas such as nitrogen, thus in preferred embodiments tubing segment 237 is in fluid communication with the nitrogen gas regulator 108 (not shown) of the apparatus.

Once the formulation of the radiopharmaceutical is complete it is necessary to extract the reaction product from the reaction vessel 208. This is achieved by forcing the contents of the reaction vessel through tubing segment 235, 238 and 241 by the application of gas pressure via tubing segment 207. Optionally, the contents of the reaction vessel can be removed via tubing segments 235, 238 and 242, which deliver the contents to waste receptacle 243. This procedure may be desirable, for example, during cleaning of the system.

When the formulation of the radiopharmaceutical is complete the solution in reaction vessel 208 is removed by applying nitrogen gas pressure to the materials in the reaction vessel 208. The liquids in the vessel are thus forced into tubing segment 235 and are then expelled at tubing segment 241 and 242, as appropriate. Nitrogen gas can enter the formulation section via either tubing segment 219 or 226.

Tubing segments 202, 204, 207, 210, 211, 216, 217, 219, 220, 224, 226, 227, 231 (not shown), 232, 233 (not shown), 235, 237, 238, 241 and 242 are all at least partially mounted on cassette frame 203 as described above with reference to tubing segment 104. In the embodiment depicted in the figures, the tubing is pressed into semi-circular channels 202a, 204a, 207a, 210a, 211a, 216a, 217a, 219a, 220a, 224a, 226a, 227a, 231a (not shown), 232a, 233a (not shown), 235a, 237a, 238a, 241a and 242a (see FIG. 15) in the rigid support structure of the cassette, however any appropriate means of mounting the tubing known to those skilled in the art can be used to achieve a similar result. The tubing can be removed from the rigid support structure and replaced with new tubing, but in other embodiments the entire cassette is removed from the device and replaced with a new cassette when it is necessary to replace the tubing. In other embodiments, the cassette can also be exchanged when it is desired to use a different radiopharmaceutical formulation protocol.

Throughout the present invention, the tubing used is preferably composed of Teflon or other suitable non-reactive organic or inorganic materials. When the tubing is composed of an organic material, it will be necessary to exchange the tubing periodically due to accelerated tubing breakdown caused by exposure to radioactive materials. In other embodiments, the cassette can also be exchanged when it is desired to use a different radioisotopic purification protocol. The cassette can then be reused or disposed of, depending on the needs and objectives of the user.

Furthermore, the portions of the tubing of the present invention that comes in contact with reagents or fluid used in the purification or formulation process are preferably non-pyrogenic and/or sterile.

Tubing for use in the present invention is preferably chemically-inert tubing with a high cycle life. Such tubing will also preferably comply with USP XXII, Class VI, FDA and USDA standards and the like. However any type of tubing may be used that (a) can be compressed by a valve to regulate the flow of fluids in the tubing and (b) that is suitable for the purification of radioisotopes or formulation of radiopharmaceuticals.

The pinch valves 205, 212, 215, 221, 228, 230, 240, 244 and 245 are solenoid-type 3-way pinch valves such as those made by BioChem (Boonton, N.J.), however, any type of valve known to those of skill in the art can be used in the present invention.

The apparatus of the present invention further comprises radiation detectors for monitoring during a purification process the radioactive emissions present at various sections of the apparatus. In certain embodiments, these detectors can permit an operator or a computer to determine when to implement the next step in the purification process. In other embodiments, the detectors monitor the progress and yield of the purification process. The embodiment depicted in the examples uses diodes, however other suitable radiation detection devices can also be used, as described above with reference to the purification panel.

In other embodiments, pressure sensors can be provided at appropriate locations to detect and monitor the flow of nitrogen or other gases within the system and to identify the presence of leaks in the system. In preferred embodiments the pressure sensors are located upstream at or near the source of gas entry into the system and alternatively or additionally at the concentration or reaction vessels.

One such detector is diode 144 (not shown) which is placed such that it can monitor the amount of radiation emanating from the contents of waste collection vessel 115. A second diode 145 is placed to monitor the radiation emanating from the contents of concentration vessel 116. A third diode 146 (not shown) is placed to monitor the radiation emanating from chromatography column 135. Finally, a fourth diode 147 (not shown) is placed to monitor the radiation emanating from waste collection vessel 142.

In alternative configurations, the present invention can further comprise one or more additional reaction vessels to accommodate more complex radiopharmaceutical synthesis protocols. Additionally or alternatively, the valves, network of tubing or other elements can be reconfigured as required for a particular synthesis protocol. Numerous such arrangements will be apparent to one of skill in the art in light of the present disclosure.

Reagents and Solutions for Use with the Present Invention

The apparatus of the present invention is capable of supporting a number of different radioisotope purification protocols and a number of different radiopharmaceutical purification protocols. Once transferred to the formulation section, for example, any bioconjugate possessing suitable electron-rich coordinating atoms (e.g. N, O, S, P) can be coordinated with $^{68}$Ga or other radioisotopes. Chelators which bind radiometals and are conjugated to targeting molecules are referred to as bifunctional chelating agents (BFCAs).

Examples of suitable bioconjugates known to those skilled in the art includes, but is not limited to, desferal-based bioconjugates, bifunctional chelators based on tetraazo compounds such as 1,4,7-triazacyclonane-N,N',N"-tri-acetic acid and 1,4,7,10-tetraazacyclododecane-N,N',N",N'"-tetraacetic acid (DOTA) and cyclams, (1-(1-carboxy-3-carboxy-propyl)-4,7-(carboxy,methyl)-1,4,7-triazacyclononane (NODAGA), diethylenetriaminepenaacetic acid (DTPA), hydrazinonicotinamide (HYNIC), mercaptoacetyltriglycine (MAG3), ethylenedicysteine (EC), Tyr$^3$-octreotide based bioconjugates such as DOTA$^0$-D-Phe$^1$-Tyr$^3$-octreotide (DOTATOC) and NODAGA-Tyr3-octreotide (NODAGA-TOC), S$_3$N ligands such as bis(2-(benzylthio)benzyl)(2-(benzylthio)-4-aminobenzyl)amine, and numerous others that will be apparent to those skilled in the art.

Suitable bioconjugates generally serve two main purposes: 1) to coordinate the radiometal and 2) to provide a molecular backbone that can be modified with functional groups for attachment to the targeting molecule. Conjugation of radiometal chelators can be applied to multiple classes of compounds described below. In certain embodiments these bioconjugates could then be radiolabeled using the apparatus of the present invention through an automated synthetic scheme to yield the final form of the radiotracer.

Classes of targeting molecules include, but are not limited to, disease cell cycle targeting compounds, angiogenesis targeting ligands, tumor apoptosis targeting ligands, disease receptor targeting ligands, drug-based ligands, antimicrobials, agents that mimic glucose, tumor hypoxia targeting ligands and the like.

Disease cell cycle targeting compounds are often nucleoside analogues. For example, pyrimidine nucleoside (e.g., 2'-fluoro-2'-deoxy-5-iodo-1-β-D-arabinofuranosyluracil (FIAU), 2'-fluoro-2'-deoxy-5-iodo-1-β-D-ribofuranosyluracil (FIRU), 2'-fluoro-2'-5-methyl-1-β-D-arabinofuranosyluracil (FMAU), 2'-fluoro-2'-deoxy-5-iodovinyl-1-β-D-ribofuranosyluracil (IVFRU) and acycloguanosine: 9-[(2-hydroxy-1-(hydroxymethyl)ethoxy)methyl]guanine (GCV) and 9-[4-hydroxy-3-(hydroxymethyl)butyl]guanine (PCV) and other 18F-labeled acycloguanosine analogs, such as 8-fluoro-9-[(2-hydroxy-1-(hydroxymethyl)ethoxy)methyl] guanine (FGCV), 8-fluoro-9-[4-hydroxy-3-(hydroxymethyl) butyl]guanine (FPCV), 9-[3-fluoro-1-hydroxy-2-propoxy methyl]guanine (FHPG) and 9-[4-fluoro-3-(hydroxymethyl) butyl]guanine (FHBG) have been developed as reporter substrates for imaging wild-type and mutant HSV1-tk expression.

Examples of angiogenesis targeting ligands include COX-2 inhibitors, anti-EGF receptor ligands, herceptin, angiostatin, C225, and thalidomide. COX-2 inhibitors include, for example, celecoxib, rofecoxib, etoricoxib, and analogs of these agents.

Tumor apoptosis targeting ligands include, but are not limited to, TRAIL (TNF-related apoptosis inducing ligand) monoclonal antibody, substrates of caspase-3, such as peptide or polypeptide that includes the 4 amino acid sequence aspartic acid-glutamic acid-valine-aspartic acid, any member of the Bcl family.

Examples of disease receptor targeting ligands include, but are not limited to, estrogen receptors, androgen receptors, pituitary receptors, transferrin receptors, and progesterone receptors. Examples of agents that can be applied in disease-receptor targeting include androgen, estrogen, somatostatin, progesterone, transferrin, luteinizing hormone, and luteinizing hormone antibody. The folate receptor is included herein as another example of a disease receptor. Examples of folate receptor targeting ligands include folic acid and analogs of folic acid. Preferred folate receptor targeting ligands include folate, methotrexate and tomudex.

Certain drug-based ligands can be applied in measuring the pharmacological response of a subject to a drug. A wide range of parameters can be measured in determining the response of a subject to administration of a drug. One of ordinary skill in the art would be familiar with the types of responses that can be measured. These responses depend in part upon various factors, including the particular drug that is being evaluated, the particular disease or condition for which the subject is being treated, and characteristics of the subject. Examples of drug-based ligands include carnitine and puromycin.

Any antimicrobial is contemplated for inclusion as a targeting ligand. Preferred antimicrobials include ampicillin, amoxicillin, penicillin, cephalosporin, clidamycin, gentamycin, kanamycin, neomycin, natamycin, nafcillin, rifampin, tetracyclin, vancomycin, bleomycin, and doxycyclin for gram positive and negative bacteria and amphotericin B, amantadine, nystatin, ketoconazole, polymycin, acyclovir, and ganciclovir for fungi.

Agents that mimic glucose are also contemplated for inclusion as targeting ligands. Preferred agents that mimic glucose, or sugars, include neomycin, kanamycin, gentamycin, paromycin, amikacin, tobramycin, netilmicin, ribostamycin, sisomicin, micromicin, lividomycin, dibekacin, isepamicin, astromicin, aminoglycosides, glucose or glucosamine.

Tumor hypoxia targeting ligands are also useful in certain embodiments of the present invention. Misonidazole, an example of a tumor hypoxia targeting ligand, is a hypoxic cell sensitizer, and labeling MISO with different radioisotopes (e.g., $^{18}$F, $^{123}$I, $^{99m}$Tc) may be useful for differentiating a hypoxic but metabolically active tumor from a well oxygenated active tumor by PET or planar scintigraphy. [$^{18}$F]Fluoromisonidazole (FMISO) has been used with PET to evaluate tumor hypoxia.

To quench the bioconjugation reaction, a transchelator can be added to the radiotracer to remove any free radioisotope. Examples of acceptable transchelators for $^{68}$Ga include polycarboxylic acids, e.g., tartrate, citrate, phthalate, iminodiacetate, ethylenediaminetetraacetic acid (EDTA), diethylenetriaminepentaacetic acid (DTPA) and the like. Additionally, any of a variety of anionic and/or hydroxylic oxygen-containing species could serve this function, e.g., salicylates, acetylacetonates, hydroxyacids, catechols, glycols and other polyols, e.g., glucoheptonate, and the like. Other suitable reagents and protocols for the formulation of radiopharmaceuticals will be apparent to those skilled in the art and may be readily adapted for use with the apparatus of the present invention.

Finally, the apparatus allows the dispensing of buffer solution into the final radiopharmaceutical formulation, if desired. The buffer may be any buffer that achieves the desired pH and solution strength in the final product, including phosphate, acetate, bicarbonate, 4-(2-Hydroxyethyl)piperazine-1-ethanesulfonic acid (HEPES), citrate, borate buffers and the like.

Control System

Any appropriate control system can be used in the present invention. The control system is preferably one capable of integrating the sensors and actuators found in the apparatus. In certain embodiments the control system comprises a computing device that executes instructions stored in a program storage device and sends commands to a controller. The control system, for example, can be a personal computer or laptop computer. In preferred embodiments the control system is a programmable circuit that operates in accordance with instructions stored in program storage media. Programmable circuits include, but are not limited to, microprocessors or digital signal processor-based circuits. The program storage media or software can be any type of readable memory including, but not limited to, magnetic or optical media such as a card, tape or disk, or a semiconductor memory such as PROM or FLASH memory. The controller functions, for example, to open or close valves, control a heater, a syringe pump, a vacuum pump, a gas regulator or any other actuator within the apparatus. In certain embodiments the controller is a programmable logic controller.

In certain embodiments, the control system will include a program storage media or software package that contains instructions for the purification, synthesis or combined purification and synthesis of one, two, three, four, five, six, ten, twenty or more different radioisotopes or radiopharmaceuticals using the apparatus of the present invention and the appropriate reagents.

The control system of the present invention in certain embodiments includes feedback mechanisms that monitor the temperature and radiation levels at various points in the process and the flow of reagents or gases through the system.

In other embodiments the control system comprises mechanisms for detecting the presence of an installed cassette and additionally or alternatively for identifying the type of cassette installed.

Console

The apparatus of the present invention can be assembled as a single console or electromechanical instrument. In certain embodiments, the apparatus comprises both a purification and a formulation panel mounted on a platform or base. In certain embodiments, the purification and formulation panels are situated at an approximately 90 degree angle to one another in order to reduce the volume of the overall apparatus. In certain such embodiments, the purification formulation panel is moveable with respect to each other to increase the angle for loading and maintenance procedures. In some embodiments, the platform further comprises receptacles for one, two, three, four, five, six or more waste receptacles. The platform can further have mounted to it or integrated within it one or more of the following: receptacles for one or more replaceable automated pumps, one or more non-replaceable pumps, one or more reaction or fluid collection vessels mounted on the panel, one or more radiation sensors, one or more temperature sensors, one or more gas regulators, and one or more programmable logic controllers or other means of controlling one or more actuators associated with the platform.

In certain preferred embodiments, the apparatus further includes a recess for the placement of at least one generator on the platform.

In certain embodiments, the console can further comprise a cover for shielding some or all of the components mounted on the platform from dust or other environmental hazards, or alternatively to provide additional shielding from radiation. In certain embodiments, the console may comprise a control panel for monitoring the progress of a radioisotope purification or radiopharmaceutical formulation protocol or for controlling the function of the console. In other embodiments, a control panel or control device is provided additionally, or alternatively, at a distance from the console.

Cassettes and Kits of the Present Invention

A key aspect of certain embodiments of the present invention are the replaceably interchangeable cassettes and kits and methods of their use disclosed herein. The use of compressible tubing and valves that compress the tubing make the exchange of one cassette for another a simple and quick procedure. The tubing can be quickly removed from engagement with the valves. Once the connections made by the tubing to other elements of the apparatus are disconnected, the cassette can be removed from the apparatus and can be replaced by the new cassette. Systems in which tubing is used to compress tubing to control the flow of fluids are advantageous because there is no possibility of contaminating the valves, thus valve cleaning is not required during the normal course of operation.

During installation of the interchangeable cassettes, connections are preferably also made to the concentration vessel, chromatography column, waste vessels, nitrogen regulator, vacuum pump and the like. It is also preferable to install new pump reservoirs containing appropriate reagents or fluids for use with the purification or formulation panels during installation of the cassette. However in alternate embodiments the existing pump reservoirs can be refilled with the appropriate reagents or fluids prior to use of the newly replaced cassettes.

Cassettes of the present invention preferably includes color-coding or another type of labeling that indicates to the user where various tubing connections should be made with the apparatus (not shown). In other preferred embodiments, the pump reservoirs (such as syringes) are also replaced at the same time that a new cassette is installed in the device. In some embodiments there can additionally be color-coded or other type of labeling that indicates where the replacement reservoirs are to be placed in the apparatus.

In preferred embodiments one or more cassettes and one or more pump reservoirs will be provided as a kit. Alternatively, or additionally, the kit can contain reagents or other liquids supplied in one or more replaceable pump reservoirs or in separate containers that can be used for filling the appropriate pump reservoir. These reagents or other liquids can be any reagents or liquids intended for use with the isotope or formulation cassettes. In less preferred embodiments, the reagents or liquids required for a particular purification or formulation protocol can be supplied as a separate kit, with or without the appropriate pump reservoirs, but without a cassette.

Kits of the present invention therefore provide materials that aid the user in preparing the apparatus for purification and/or formulation cycles. For example, a preferred kit for purification of radioisotopes can include one or more isotope cassettes, one or more replaceable pump reservoirs and one or more of the following solutions: (i) a solution appropriate for milking a generator, preferably a solution of a pharmaceutically-acceptable acid or a pharmaceutically-acceptable buffer, more preferably a dilute solution of HCl of about 0.05 N to about 1.5 N; most preferably about 0.1 N HCl or about 1.0 N HCl; (ii) a solution appropriate for concentrating the radioisotope, preferably a first concentrated solution of a pharmaceutically-acceptable acid, more preferably a concentrated solution of HCl about 10% to about 50%; most preferably a solution of about 30% HCl; (iii) a solution appropriate for eluting contaminants such as $^{68}$Ge from a chromatography column, preferably a second concentrated solution of a pharmaceutically-acceptable acid, more preferably a concentrated solution of HCl of about 3 N to about 5.5 N; most preferably about 4 N HCl; and (iv) a solution appropriate for eluting radioisotope such as $^{68}$Ga from a chromatography column, preferably a water or buffer solution; most preferably distilled $H_2O$. In preferred embodiments the supplied solutions are sterile and/or non-pyrogenic.

As a further example, a preferred kit for formulation of radiopharmaceuticals can include one or more formulation cassettes, one or more pump reservoirs and one or more of the following solutions: (i) a solution containing a chelating-bioconjugate, (ii) a solution containing a transchelator; and (iii) a water or buffer solution. In preferred embodiments the supplied solutions are sterile and/or non-pyrogenic.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute embodiments for its practice. However, those of skill in the art should, in light of the present disclosure, appreciate that many changes can be made in the specific embodiments which are disclosed and still obtain a like or similar result without departing from the spirit and scope of the invention.

EXAMPLE 1

$^{68}$Ge/$^{68}$Ga-Generator Acceptance Testing

Elution Profile. To obtain the highest radioactivity of $^{68}$Ga in minimal volume, the $^{68}$Ge/$^{68}$Ga generator was eluted and collected in separate fractions. HCl (1 N, 10 ml) was used to elute the generator and the eluate was collected in 1 ml fractions. Each fraction was assayed using a dose calibrator (Capintec, Ramsey, N.J.) and corrected for decay. The resulting activity per fraction was used to depict the minimal volume required to obtain the highest activity of $^{68}$Ga.

Radionuclide Purity. To determine the radionuclide purity of $^{68}$Ga and the presence of any other trace radioactive impurities, a HPGe detector was used (Canberra Industries, Meriden, Conn.) model GC1018 (crystal is 47.5 mm diameter, 28.5 mm thick, depletion voltage +3500 volts DC, FWHM 1.6 keV for Cobolt-60 [$^{60}$Co], $t_{1/2}$=5.2 years, 1332 keV photo peak). The detector energy response was calibrated using National Institute of Standards and Technology (NIST) traceable gamma standards; Cesium-137 ($^{137}$Cs, $t_{1/2}$=30.07 years) and $^{60}$Co sources and validated by the presence of confirming the location of photopeaks of Eu-154 ($^{154}$Eu) standard ($t_{1/2}$=8.593 years, 10.1 µCi on Aug., 1, 2001 12 PST) which has main photopeaks at 723.3 and 1274 keV.

The $^{68}$Ge/$^{68}$Ga was eluted with 1N HCl and a 1 ml aliquot (2 mCi) was collected. This sample was diluted to 20 µCi and placed approximately 20 cm away from the detector. One inch thick lead blocks provided shielding of the measurement from cosmic rays and other background radiation. The acquisition was performed for 1 hour.

Radionuclide Identity. Another approach used to determine the radionuclide identity of the $^{68}$Ga eluate was experimental determination of the half-life. The $^{68}$Ge/$^{68}$Ga was eluted with 1 N HCl and a 1 ml aliquot (2 mCi) was collected. The sample was placed in a dose calibrator and the activity was recorded at the start of the experiment. The sample was assayed repeatedly at multiple time points and the activity was recorded. The data were used to generate a decay curve. From this curve, the experimental half-life was determined using the equation:

$$A = A_o e^{-kt}$$

where A=activity at time=t,
$A_o$=activity at time=0,
k=rate constant for $^{68}$Ga (k=0.693/$t_{1/2}$) and
t=time at which sample was assayed The findings were compared to the theoretical half-life to validate presence of $^{68}$Ga.

Development of $^{68}$Ga-Labeling Protocol

Synthesis of $^{68}$Ga-DOTA. $^{68}$Ga-chloride was eluted from a commercially-available $^{68}$Ge-$^{68}$Ga generator (Isotope Product Laboratories, Valencia, Calif.) using 1 N HCl (10 ml). The most concentrated eluate fractions (#2-3) were collected and transferred into a pear-shaped reaction vessel and heated at 100° C. under vacuum (containing a charcoal trap) and nitrogen stream until nearly all liquid was evaporated. The yellowish residue was reconstituted in 200 µl 0.05 N HCl, diluted with 0.1 N NH$_4$OAc, and study-specific amounts of radioactivity (100 µCi for analytic testing, 500 µCi for pharmacological studies) were added to 0.1-1000 mmol of DOTA, previously dissolved in 300 µl NH$_4$OAc. The reaction mixture was heated at 95° C. for 20 minutes and allowed to cool at room temperature for five minutes. Final volume was adjusted as desired.

Synthesis of $^{68}$Ga-EC. $^{68}$Ga-EC was synthesized based on $^{68}$Ga-DOTA methods. $^{68}$GaCl$_3$ was prepared similarly to methods described for $^{68}$Ga-DOTA and the final radioactive solution was reacted with 300-1000 nmol of EC. Ammonium acetate and sodium acetate buffers were compared along with heating at 37° C. and 95° C. for 20 minutes. Labeling conditions were further studied by adjusting the use of either buffer, NH$_4$OAc or NaOAc, for dissolving the stock solutions and adjusting the volume of the final formulation. The reaction mixture was allowed to cool at room temperature for five minutes. Final volume was adjusted as desired.

Synthesis of $^{68}$Ga-EC-Endostatin. $^{68}$Ga-EC-endostatin was synthesized based on $^{68}$Ga-EC methods. $^{68}$GaCl$_3$ was prepared similarly to methods described for $^{68}$Ga-DOTA. Sodium acetate was used at all times during synthesis. The final radioactive solution was reacted with 100 µg of EC-endostatin previously dissolved in 50 µl 1× PBS and 250 µl NaOAc. The reaction mixture was heated at 37° C. for 20 minutes and allowed to cool at room temperature for five minutes. Final volume was adjusted as desired.

Radio-TLC/Radio-HPLC. Radiochemical purity was assessed by radio-TLC (Bioscan AR-2000, Washington, D.C.) and HPLC (Waters 2487, Milford, Mass.). For radio-TLC, a 20 µl aliquot from each radiotracer was collected using glass spotters and spotted onto different ITLC-SG strips. Different mobile phases were used to demonstrate the presence of uncomplexed radioisotope in the final formulation containing the radiolabeled ligand. $^{68}$Ga radiochemistry was analyzed using 1 M ammonium acetate:methanol (4:1) as the mobile phase for all complexes. HPLC, equipped with a NaI detector and UV detector (254 nm), was performed on a GPC column (Biosep SEC-S3000, 7.8×300 mm, Phenomenex, Torrance, Calif.) using a flow rate of 1.0 ml/min.

Synthesis of $^{68}$Ga-DOTA. $^{68}$Ga-DOTA was synthesized with findings similar to the reported data. Radio-TLC analysis showed that $^{68}$GaCl$_3$ remained at the origin ($R_f$=0.0) while $^{68}$Ga-DOTA moved with an $R_f$=0.9 and 96.9% radiochemical purity. The radiochemical purity ranged from 0-99.6% and decreased as a function of decreasing amounts of DOTA. Using 10-1000 nmol of DOTA allowed for >90% labeling and served as the basis for the labeling protocol developed for $^{68}$Ga-EC.

$^{68}$GaCl$_3$ was eluted from a $^{68}$Ge/$^{68}$Ga generator with 1 N hydrochloric acid and spotted on instant thin-layer chromatography (ITLC) strip. Ammonium acetate:methanol (4:1) was used as the mobile phase and the acquisition was performed for 180 seconds using a radio-TLC scanner. >99% of total counts remained at the origin indicating the presence of $^{68}$GaCl$_3$.

DOTA (500 µg) was labeled with $^{68}$GaCl$_3$ and spotted on instant thin-layer chromatography (ITLC) strip. Ammonium acetate:methanol (4:1) was used as the mobile phase and the acquisition was performed for 180 seconds using a radio-TLC scanner. Less than 5% of the total counts were at the origin designating minimal presence of unlabeled $^{68}$GaCl$_3$ (A), while >95% moved with the solvent front indicating high labeling yields for $^{68}$Ga-DOTA (B).

DOTA (0.1-1000 nmol) was labeled with $^{68}$Ga using 0.1 N ammonium acetate, incubated at 95° C. for 20 minutes and spotted on instant thin-layer chromatography (ITLC) strips. Ammonium acetate:methanol (4:1) was used as the mobile phase and acquisitions were performed for 180 seconds using a radio-TLC scanner. Highest labeling yields were observed with 10-100 nmol, then fell significantly when using lower amount of ligand.

Synthesis of $^{68}$Ga-EC. $^{68}$Ga-EC was synthesized based on $^{68}$Ga-DOTA methods. Radio-TLC analysis showed that $^{68}$Ga-EC moved with an $R_f$=0.6 and 97.7% radiochemical purity, which differs from that of $^{68}$GaCl$_3$. The effects of different buffers and heating temperatures were examined and showed no significant differences in the radiochemical purity of $^{68}$Ga-EC in the presence of higher amounts (1000 nmol) of EC or with heating at 37° C. Taken together, the data show that EC can be labeled with $^{68}$Ga in an efficient manner using NaOAc, which is less toxic for in vitro and in vivo studies, and suitable radiochemical yields are achieved by heating at 37° C., which is the ideal incubation temperature for peptides such as endostatin.

EC (500 µg) was labeled with $^{68}$GaCl$_3$ and spotted on instant thin-layer chromatography (ITLC) strip. Ammonium acetate:methanol (4:1) was used as the mobile phase and the acquisition was performed for 180 seconds using a radio-TLC scanner. Less than 5% of the total counts were at the origin designating minimal presence of unlabeled $^{68}$GaCl$_3$ (A), while >95% moved with the solvent front indicating high labeling yields for $^{68}$Ga-EC (B).

Synthesis of $^{68}$Ga-EC-Endostatin. $^{68}$Ga-EC-endostatin was synthesized. Radio-TLC analysis showed that $^{68}$Ga-EC-endostatin remained at the origin ($R_f$=0.0), which is typical for peptides, proteins and antibodies, and different from $^{68}$Ga-EC The counts at the origin are not due uncomplexed $^{68}$GaCl$_3$, since the presence of EC in the biomolecule would chelate the radiometal with high affinity under these reaction conditions. Therefore, a simple and efficient labeling method was developed for the preparation of $^{68}$Ga-EC-endostatin. This data can, however, be coupled with pharmacological findings to determine the presence of uncomplexed $^{68}$GaCl$_3$ in the final formulation.

$^{68}$Ga-EC-endostatin was analyzed by radio thin-layer chromatography (radio-TLC). EC-endostatin (10 µg) was labeled with $^{68}$GaCl$_3$ and spotted on instant thin-layer chromatography (ITLC) strip. Ammonium acetate:methanol (4:1) was used as the mobile phase and the acquisition was performed for 180 seconds using a radio-TLC scanner. As typically found for peptides and antibodies, >98% of the total counts were at the origin suggesting the presence of $^{68}$Ga-EC-endostatin.

EXAMPLE 2

Purification of radioisotopes for preparation of high-grade $^{68}$Ga from generator eluate using SMARTRACE, a fully-automated, turn-key system for purification of radioisotopes and formulation of radiopharmaceuticals similar to the device depicted in FIG. 1-FIG. 15, FIG. 32, and FIG. 33, will be performed using the steps described in FIG. 16-FIG. 24, or the following series of steps:

- Syringe-pump controlled elution of the generator with 5 ml of 0.1 N HCl (Trace-Metal free) will initiate the process
- 5 ml of eluate will be transferred into a concentration vessel
- 6 ml of 30% HCl will be added to the eluate to raise the concentration to 4 M
- The total volume will be passed through a Chromafix SAX SPEC anion exchange resin, trapping $^{68}$Ga and $^{68}$Ge, and collecting the HCl solution in a waste bottle #2
- 3 ml of 4 M HCl will be passed through the anion exchange resin to remove $^{68}$Ge and will be collected in a waste bottle
- Waste bottle #2 is equipped with a GM detector to monitor and report the presence of $^{68}$Ge breakthrough during each synthesis as well at delayed time points
- The tubing will be purged with N$_2$ gas to remove all HCl traces
- $^{68}$Ga will be removed from the anion exchange resin using MilliQ water (1-3 ml, dictated by type of study) and transferred into the reaction vessel in the formulation panel
- All transfer steps are regulated by the flow of N$_2$ gas at a rate of 200 ml/min.

EXAMPLE 3

Formulation high-grade $^{68}$Ga radiopharmaceuticals from generator from the radioisotopes purified as in Example 2 using the SMARTRACE, a fully automated system for purification of radioisotopes and formulation of radiopharmaceuticals similar to the device depicted in FIG. 1-FIG. 15, FIG. 32, and FIG. 33, will be performed using the steps described in FIG. 25-FIG. 31, or the following series of steps:

- Reaction vessel receives clinical-grade $^{68}$Ga from the purification panel
- Syringe pumps will dispense a 125 µM solution of EC-glucosamine (2 ml) into the reaction vessel
- Reaction vessel will be heated at 95° C. for 10 min
- Using the dilution option, final volume will be adjusted with normal saline to achieve desired strength
- Final product will be transferred into a sterile collection vial equipped with a 0.22 µm syringe filter and the radioactivity will be assayed by a diode
- System parameters will be logged and transferred to an Excel spreadsheet to show profiles for each process and provide relevant data for calculating radioactive yield.

EXAMPLE 4

Additional features/capabilities of the purification panel as discussed in Example 2 will include Elution Profile: The design of SMARTRACE will allow for fractionated elution of the generator by dispensing 1 ml of HCl to collect the "dead volume" in waste bottle #1. Diode #1 will monitor the radioactivity in this bottle. Fractions 2 and 3 will be collected in the concentration vessel and the activity will be measured with diode #2. The remaining 2 ml will be collected in waste bottle #1 and measured. Calibration of the diodes will allow for accurate measurement and reporting of radioactivity of each fraction in mCi or MBq. All data will be plotted into an Excel spreadsheet where time-activity curves will be generated for quality assurance of the process as well as for monitoring the useful shelf-life of the generator. This will permit the automated characterization of the elution profile of the generator over a period of time.

Parent ($^{68}$Ge) Breakthrough: Diode #3 (or a GM detector) located at waste bottle #2 with be used to measure the $^{68}$Ge breakthrough. Waste from the generator eluate will be measured with the detector immediately and after 24-48 hrs in order to determine the $^{68}$Ge breakthrough (at least 30 half-lives of $^{68}$Ga). The $^{68}$Ge contamination will be defined as % $^{68}$Ge in the $^{68}$Ga eluate. The $^{68}$Ge breakthrough losses of 0.001% or less have been shown in the literature to be insignificant compared with $^{68}$Ge decay losses, assuming two elutions per day. The $^{68}$Ge breakthrough characteristics of a generator will be monitored over the useful shelf-life of the generator, i.e. 12 months.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents that are chemically or physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.
1. Meyer, G. J., H. Macke, J. Schuhmacher, W. H. Knapp and M. Hofmann. *$^{68}$Ga-labelled DOTA-derivatised peptide ligands*, Eur. J. Nucl. Med. Mol. Imaging (2004) 31:1097-1104 (2004).
2. WO 2005/057589 A2
3. Maecke, H. R., M. Hofmann, and U. Haberkorn. *$^{68}$Ga-Labeled Peptides in Tumor Imaging*, J. Nucl. Med. 46:172S-178S (2005).
4. WO 2004/089517 A1
5. WO 2004/089425 A1

What is claimed is:

1. An automated system for purifying and concentrating a radioisotope for human-grade radiopharmaceutical production containing the purified radioisotope comprising:
   an elution station capable of receiving an isotope from a radionuclide generator;
   a module comprising a purification panel and a base panel; wherein the purification panel further includes a plurality of valves and at least one reaction vessel, and wherein the base panel includes at least one waste-collection station;
   a reusable interchangeable radioisotope specific purification cassette capable of receiving a radioisotope from the elution station comprising one or more networks of tubing mounted on a rigid support, wherein the purification cassette connects to the purification panel of the module and the network of tubing is engaged by one or more of the plurality of valves;
   one or more fluidic pumps in fluid communication with the network of tubing of the purification cassette;
   at least one chromatography column in fluid communication with the network of tubing of the purification cassette; and
   a control system, wherein the pumps and valve assemblies are at least partially controlled by the control system.

2. The automated system of claim 1 further comprising:
   a formulation panel as part of the module, wherein the formulation panel includes a plurality of valves and at least one reaction vessel;
   a reusable interchangeable specific formulation cassette comprising one or more networks of tubing mounted on a rigid support, wherein the formulation cassette connects to the formulation panel of the module and the network of tubing is engaged by one or more of the plurality of valves and is in fluid communication with the purification cassette; and
   the one or more pumps in fluid communication with the network of tubing of the formulation cassette.

3. The automated system of claim 2, wherein the valves are selected from the group consisting of pinch valves and stopcock valves.

4. The automated system of claim 2 wherein the elution station is adjustable to receive radioisotope from a variety of generators.

5. The automated system of claim 4 wherein the generator is selected from a group comprising $^{44}$Ti/$^{44}$Sc, $^{52}$Fe/$^{52m}$Mn, $^{62}$Zn/$^{62}$Cu, $^{68}$Ge/$^{68}$Ga, $^{72}$Se/$^{72}$As, $^{82}$Sr/$^{82}$Rb, $^{99}$Mo/$^{99m}$Tc, $^{118}$Te/$^{118}$Sb, $^{122}$Xe/$^{122}$I, $^{128}$Ba/$^{128}$Cs, $^{178}$W/$^{178}$Ta, $^{188}$W/$^{188}$Re and $^{195m}$Hg/$^{195m}$Au generators.

6. The automated system of claim 2, further comprising a radiation sensor.

7. The automated system of claim 6, wherein the radiation sensor is positioned to detect and quantify radioactivity from the at least one waste-collection station and relays such information to the control system to provide a $^{68}$Ge breakthrough measurement on the eluate from a $^{68}$Ge/$^{68}$Ga generator.

8. The automated system of claim 2 further comprising an optical reader connected to the control system and a tag attached to one or both of the purification cassette and formulation cassette, wherein the tag is readable by the optical reader.

9. The automated system of claim 8, wherein the tag is read by the optical reader and enables a specific radioisotope purification protocol which is dedicated to the purification cassette.

10. The automated system of claim 8, wherein the tag is read by the optical reader and enables a specific formulation protocol which is dedicated to the formulation cassette.

11. The automated system of claim 2, wherein the purification panel is attached to the base panel at approximately a 90° angle from the formulation panel.

12. The automated system of claim 2, wherein the purification panel and the formulation panel are slideably rotatable on the base panel such that the angle between the purification panel and the formulation panel can be increased up to 180°.

13. The automated system of claim 2 wherein the elution station receives radioisotope from one or more generators mounted in parallel.

14. The automated system of claim 2, wherein the network of tubing on the purification and formulation cassettes further includes color-coded connection points to ensure accurate and efficient assembly.

15. The automated system of claim 2, wherein the base panel further includes at least one selected from the group consisting of a radiation sensor, pressure sensor, temperature sensor, gas regulator, and vacuum pump.

16. The automated system of claim 15, further comprising a radiation sensor and plastic connectors on the at least one chromatography column.

17. An automated system for purifying and concentrating radioisotopes and formulating human-grade radiopharmaceuticals comprising:
   an elution station capable of receiving a radioisotope from at least one radionuclide generator;
   one or more fluidic pumps;

a module comprising:
- a base panel that includes at least one waste-collection reservoir, a collimated radiation detector, a vacuum pump, and a heater;
- a purification panel that includes at least one valve and a replaceable chromatography column having an input end and an output end;
- a formulation panel that includes one or more valves; and
- at least one fluid collection reservoir;
- at least one reaction vessel;

a control system electronically connected to at least one of the following: the at least one valve, the collimated radiation detector, the vacuum pump, the heater, the gas flow regulator, or the one or more fluidic pumps;

a removable radioisotope specific purification cassette which includes a network of tubing mounted on a rigid support and attaches to the purification panel of the module, wherein the network of tubing comprises:
- a first tubing segment in fluid communication with the elution station and the at least one fluid collection reservoir;
- a second tubing segment in fluid communication with the at least one fluid collection reservoir and a reagent reservoir;
- a third tubing segment in fluid communication with the at least one fluid collection reservoir and the input end of the chromatography column; and
- a fourth tubing segment in fluid communication with the output end of the chromatography column;

a removable specific formulation cassette which includes a network of tubing mounted on a rigid support and attaches to the formulation panel of the module, wherein the network of tubing comprises:
- a first tubing segment in fluid communication with the network of tubing of the purification cassette and the at least one reaction vessel;
- a second tubing segment in fluid communication with the at least one reaction vessel and at least one reagent reservoir; and
- a third tubing segment for radiopharmaceutical collection in fluid communication with the at least one reaction vessel.

18. The automated system of claim 17, wherein one or more of the tubing segments is in fluid communication with a gas regulator capable of directing the flow of liquids within the tubing segments.

19. The automated system of claim 17, further comprising a heating device in thermal communication with at least one reaction vessel or collection vessel.

20. The automated system of claim 17, wherein the purification panel and the formulation panel are at an approximately 90° angle to each other.

21. An automated system comprising:
a. a removable radioisotope specific purification cassette which includes a network of tubing mounted on a rigid support, wherein the network of tubing comprises:
- a first tubing segment that connects in fluid communication with an elution station and at least one fluid collection reservoir;
- a second tubing segment that connects in fluid communication with the at least one fluid collection reservoir and a reagent reservoir;
- a third tubing segment that connects in fluid communication with the at least one fluid collection reservoir and an input end of a chromatography column; and
- a fourth tubing segment that connects in fluid communication with an output end of the chromatography column;

b. wherein, the reagent reservoir also contains a sterile, non-pyrogenic solution of about 4.0 N to about 9.5 N HCl.

22. A kit for use with the automated system of claim 21 comprising:
a. a removable radioisotope specific purification cassette which includes a network of tubing mounted on a rigid support, wherein the network of tubing comprises:
- a first tubing segment that connects in fluid communication with an elution station and the at least one fluid collection reservoir;
- a second tubing segment that connects in fluid communication with the at least one fluid collection reservoir and a reagent reservoir;
- a third tubing segment that connects in fluid communication with the at least one fluid collection reservoir and an input end of a chromatography column; and
- a fourth tubing segment that connects in fluid communication with an output end of the chromatography column;

b. a reagent reservoir having a sterile, pharmaceutical grade non-pyrogenic solution of a chelating bioconjugate;

c. a reagent reservoir having a sterile, non-pyrogenic buffer solution; and d. a reagent reservoir having a sterile, pharmaceutical grade non-pyrogenic solution of transchelator.

23. An automated system for purifying and concentrating a radioisotope and formulating human-grade radiopharmaceuticals containing the purified radioisotope comprising:
an elution station capable of receiving an isotope;
a module comprising a formulation panel and a base panel; wherein the formulation panel further includes a plurality of valves and at least one reaction or fluid collection vessel;
a reusable interchangeable specific formulation cassette capable of receiving an isotope and further comprising one or more networks of tubing mounted on a rigid support, wherein the formulation cassette connects to the formulation panel of the base unit and the network of tubing is engaged by one or more of the plurality of valves;
one or more fluidic pumps in fluid communication with the network of tubing of the formulation cassette; and
a control system, wherein the pumps and valve assembly are at least partially controlled by the control system.

24. The automated system of claim 23, wherein the valves are selected from the group consisting of pinch valves and stop-cock valves.

25. The automated system of claim 23, further comprising radiation sensors that detect and quantify radioactivity from at least one point within the network of tubing of the formulation cassette or fluid collection vessel and relays such information to the control system.

26. A method of purifying and concentrating a radioisotope comprising:
receiving a fluid isotope composition from a radionuclide generator;

purifying said isotope composition at a module comprising a purification panel and a base panel wherein said purification panel comprises a reusable interchangeable radioisotope specific cassette, a plurality of valves and at least one reaction vessel, and wherein said base panel includes at least one waste-collection station;

transferring fluids from said purification panel to at least one chromatography column; and controlling said steps of receiving, purifying, and transferring by an automated control system.

27. The method of claim 26, wherein said automated control system is a computer.

28. The method of claim 26, wherein said step of receiving is an elution station that delivers an isotope from one or more radionuclide generators in parallel.

29. The method of claims 26, wherein said step of purifying comprises:

Passing the isotope composition through a purification panel that includes at least one valve and a replaceable chromatography column having an input end and an output end;

at least one fluid collection reservoir; and at least one reaction vessel.

30. The method of claims 26, wherein said step of fluid transfer comprises one or more fluidic pumps in fluid communication with the network of tubing of the purification cassette.

* * * * *